United States Patent
Reichenbach-Klinke et al.

(10) Patent No.: US 8,763,698 B2
(45) Date of Patent: *Jul. 1, 2014

(54) PROCESS FOR PRODUCING MINERAL OIL FROM UNDERGROUND FORMATIONS

(75) Inventors: Roland Reichenbach-Klinke, Traunstein (DE); Andrea Aβmann, Unterreit (DE); Björn Langlotz, Trostberg (DE); Christian Spindler, Ludwigshafen (DE); Russell Giesbrecht, Calgary (CA)

(73) Assignees: BASF SE, Ludwigshafen (DE); BASF Canada, Toronto (CA)

( * ) Notice: Subject to any disclaimer, the term of this patent is extended or adjusted under 35 U.S.C. 154(b) by 93 days.

This patent is subject to a terminal disclaimer.

(21) Appl. No.: 13/440,049

(22) Filed: Apr. 5, 2012

(65) Prior Publication Data

US 2012/0255731 A1    Oct. 11, 2012

Related U.S. Application Data

(60) Provisional application No. 61/473,190, filed on Apr. 8, 2011.

(51) Int. Cl.
    *E21B 43/22*    (2006.01)
(52) U.S. Cl.
    USPC .......................... 166/275; 166/300; 166/369
(58) Field of Classification Search
    None
    See application file for complete search history.

(56) References Cited

U.S. PATENT DOCUMENTS

| | | | |
|---|---|---|---|
| 3,908,760 A | 9/1975 | Clampitt et al. | |
| 4,182,417 A | 1/1980 | McDonald et al. | |
| 4,613,631 A | 9/1986 | Espenscheid et al. | |
| 4,776,398 A | 10/1988 | Chu et al. | |
| 5,741,947 A | 4/1998 | Wolf et al. | |
| 6,803,348 B2 | 10/2004 | Jones et al. | |
| 7,150,319 B2 | 12/2006 | Heier et al. | |
| 2007/0204989 A1 | 9/2007 | Tang | |
| 2008/0035344 A1 | 2/2008 | Odeh et al. | |
| 2008/0200590 A1 | 8/2008 | Schinabeck et al. | |
| 2010/0292109 A1 | 11/2010 | Moradi-Araghi et al. | |
| 2010/0331510 A1 | 12/2010 | Reichenbach-Klinke et al. | |
| 2011/0237468 A1 | 9/2011 | Reichenbach-Klinke et al. | |

FOREIGN PATENT DOCUMENTS

| | | | |
|---|---|---|---|
| CA | 2760734 A1 | 11/2010 | |
| CA | 2765923 A1 | 2/2011 | |
| DE | 4325237 A1 | 2/1995 | |
| DE | 10243361 A1 | 4/2004 | |
| DE | 10 2004 032 304 A1 | 2/2006 | |
| EP | 705854 A1 | 4/1996 | |
| RU | 2 361 074 C2 | 7/2009 | |
| SU | 1 654 554 A1 | 6/1991 | |
| WO | WO 85/03510 | 8/1985 | |
| WO | WO-2007126318 A1 | 11/2007 | |
| WO | WO-2010069607 A1 | 6/2010 | |

(Continued)

OTHER PUBLICATIONS

U.S. Appl. No. 13/378,684, filed Jan. 12, 2012, Pfeuffer et al.

(Continued)

*Primary Examiner* — Zakiya W Bates
(74) *Attorney, Agent, or Firm* — Drinker Biddle & Reath LLP

(57) ABSTRACT

The present invention relates to a process for producing mineral oil from underground formations, wherein, in one process step, permeable regions of the underground formation are blocked by injecting aqueous formulations of hydrophobically associating copolymers into the formation.

21 Claims, 1 Drawing Sheet

(56) References Cited

FOREIGN PATENT DOCUMENTS

| WO | WO-2010/133527 A2 | 11/2010 |
|----|-------------------|---------|
| WO | WO-2011/015520 A1 | 2/2011  |
| WO | WO 2012/069438    | 5/2012  |
| WO | WO 2012/069477    | 5/2012  |
| WO | WO 2012/069478    | 5/2012  |
| WO | WO 2012/136613    | 10/2012 |

OTHER PUBLICATIONS

U.S. Appl. No. 13/303,649, filed Nov. 23, 2011, Langlotz et al.
U.S. Appl. No. 13/303,686, filed Nov. 23, 2011, Langlotz et al.
U.S. Appl. No. 13/303,773, filed Nov. 23, 2011, Reichenbach-Klinke et al.
U.S. Appl. No. 13/292,264.
Borling et al., "Pushing Out the Oil with Conformance Control", Oilfield Review, (1994), pp. 44-58.
R.D. Sydansk "Acrylamide-Polymer/Chromium(III)-Carboxylate Gels for Near Wellbore Matrix Treatments", Proceedings Society of Petroleum Engineers, (1990), pp. 397-408.
International Preliminary Report on Patentability for PCT/EP2012/055934, mailed Oct. 8, 2013.
International Search Report for PCT/EP2012/055934, mailed Jun. 28, 2012.

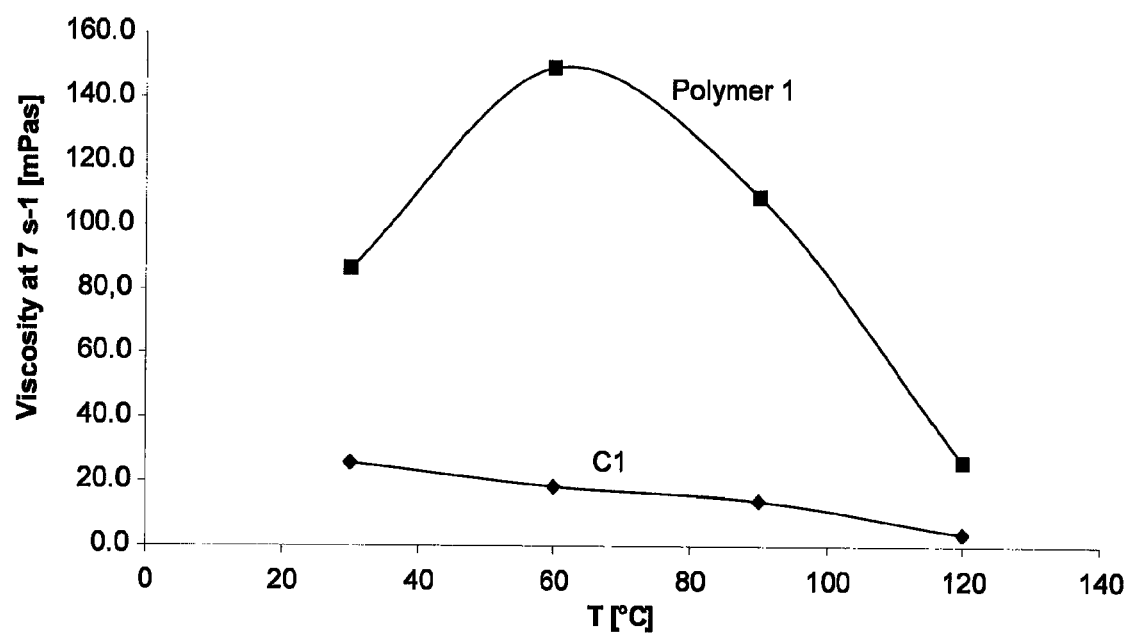

PROCESS FOR PRODUCING MINERAL OIL FROM UNDERGROUND FORMATIONS

CROSS-REFERENCE TO RELATED APPLICATIONS

This application claims benefit (under 35 USC 119(e)) of U.S. Provisional Application 61/473,190, filed Apr. 8, 2011, which is incorporated by reference.

BACKGROUND OF THE INVENTION

The present invention relates to a process for producing mineral oil from underground formations, wherein, in one process step, permeable regions of the underground formation are blocked by injecting aqueous formulations of hydrophobically associating copolymers into the formation.

In natural mineral oil deposits, mineral oil occurs in the cavities of porous reservoir rocks which are closed off from the surface of the earth by impervious covering layers. The cavities may be very fine cavities, capillaries, pores or the like. Fine pore necks may, for example, have a diameter of only approx. 1 µm. The underground formation may additionally also have regions with pores of greater diameter and/or natural fractures. In addition to mineral oil, including proportions of natural gas, a deposit generally comprises water with a greater or lesser salt content.

After a well has been sunk into the oil-bearing strata, mineral oil at first flows to the production wells owing to the natural deposit pressure, and is flushed to the surface of the earth. This phase of mineral oil production is known by the person skilled in the art as primary production. However, flush production generally ceases very rapidly, especially under poor deposit conditions, for example a high oil viscosity, rapidly declining deposit pressure or high flow resistances in the oil-bearing strata. With primary production, it is possible to produce an average of only 2 to 10% of the oil originally present in the deposit. In the case of higher-viscosity mineral oils, flush production is generally completely impossible.

In order to enhance the mineral oil yield, what are known as secondary and optionally tertiary production processes are therefore used.

One secondary mineral oil production process is called "water flooding". For this purpose, the deposit is provided with one or more injection wells in addition to the production wells, i.e. the wells through which mineral oil is withdrawn from the mineral oil formation. Water is injected into the oil-bearing strata through the injection wells. This artificially increases the deposit pressure and forces the oil from the injection wells in the direction of the production wells. Water flooding can significantly enhance the exploitation level. Instead of water, it is also possible to inject steam into the deposit ("steam flooding"). This is advisable especially when the deposit comprises high-viscosity oils.

In the course of water flooding, in the ideal case, a water front proceeding from the injection well should force the oil homogeneously over the entire mineral oil formation to the production well. In practice, a mineral oil formation, however, has regions with different levels of flow resistance. In addition to fine-porosity, oil-saturated reservoir rocks with a high flow resistance to water, there also exist regions with a low flow resistance to water, for example natural or synthetic fractures or very permeable regions in the reservoir rock. The permeable regions may also be already exploited regions. In the course of water flooding, the flooding water injected naturally flows principally through flow paths with low flow resistance from the injection well to the production well, while there is at least slower flow, if any, of water through the fine-porosity, oil-saturated deposit regions with high flow resistance. The water thus no longer flows homogeneously through the formation, and the water front is instead very irregular (called "fingering"), and an increasing amount of water and a decreasing amount of mineral oil are produced via the production well. In this connection, the person skilled in the art refers to "watering out of production". The effects mentioned are particularly marked in the case of heavy and viscous mineral oils. The higher the mineral oil viscosity, the more probable is rapid watering out of production. The problem occurs especially in the presence of fissured rock formations (called "fractured reservoirs").

There also exist mineral oil formations in which a water-bearing stratum is arranged below an oil-bearing stratum. In the course of drilling into such a formation, not only mineral oil but also water is produced, and so production here too is significantly watered out.

There has been no lack of attempts to prevent the inhomogeneous flow of water, or at least to achieve more homogeneous flow. In the prior art, there are therefore known measures for closing such highly permeable zones between the injection wells and production wells by means of suitable measures, or at least for reducing the permeability thereof. As a result, the flooding water or flooding steam is forced again to flow through the oil-saturated, low-permeability strata, and further mineral oil can thus again be mobilized. Such measures are also known as "conformance control" or "water shut-off". An overview of conformance control measures is given by Boiling et al. "*Pushing out the oil with Conformance Control*" in *Oilfield Review* (1994), pages 44 ff.

For blocking of highly permeable regions of underground formations, i.e. for conformance control, it is possible to use comparatively low-viscosity formulations of particular chemical substances which can be injected readily into the formation, and the viscosity of which rises significantly only after injection into the formation, under the conditions which exist in the formation. Such formulations comprise inorganic, organic or polymeric components suitable for increasing viscosity. The rise in viscosity of the injected formulation can occur, for example, with a simple time delay, and/or the rise in viscosity can be triggered by the temperature rise when the injected formulation in the deposit gradually heats up to the deposit temperature. Formulations whose viscosity rises only under formation conditions are known, for example, as "thermogels" or "delayed gelling systems".

SU 1 654 554 A1 discloses a process for producing oil using mixtures of aluminum chloride or aluminum nitrate, urea and water, which are injected into the mineral oil formation. The formulations naturally flow preferably along the flow paths with the lowest flow resistance. At the elevated temperatures in the formation, the urea is hydrolyzed to carbon dioxide and ammonia. The release of the ammonia base significantly increases the pH of the water, and a high-viscosity gel of aluminum hydroxide precipitates out, which blocks the highly permeable zones.

US 2008/0035344 A1 discloses a mixture for blocking of underground formations with retarded gelation, which comprises at least one acid-soluble, crosslinkable polymer, for example partly hydrolyzed polyacrylamide, a partly neutralized aluminum salt, for example an aluminum hydroxide chloride, and an activator which can release bases under formation conditions, for example urea, substituted ureas or hexamethylenetetramine. The mixture can preferably be used at a temperature of 0 to 40° C. and gelates at temperatures above 50° C., according to the use conditions, within 2 h to 10 days.

RU 2 361 074 discloses a process for blocking highly permeable zones, in which portions of formulations based on urea and aluminum salts are injected into a deposit with high deposit temperature.

U.S. Pat. No. 4,182,417, US 2007/0204989, WO 20007/126318 A1 and WO 2010/069607 A1 disclose water-swellable particles for blocking of underground formations. These particles can be injected in a suitable formulation into the underground formation, swell in the formation under the influence of the formation water and in this manner block highly permeable regions of the formation.

R. D. Sydansk "*Acrylamide-Polymer/Chromium(III)-Carboxylate Gels for Near Wellbore Matrix Treatments*" in Proceedings Society of Petroleum Engineers/US Department of Energy, 7$^{th}$ Symposium on Enhanced Oil Recovery, Apr. 22-25, 1990, Tulsa, Okla., SPE/DOE 20214, Society of Petroleum Engineers, 1990 disclose acrylamide-chromium(III) carboxylate gels for blocking of underground formations. For this purpose, acrylamide and Cr(III) carboxylates, for example Cr(III) acetate, are injected into the formation. Under the formation conditions, amide groups of the polymer are hydrolyzed to carboxylate groups. The Cr(III) carboxylate then crosslinks carboxylate groups of different polymer strands, thus forming a viscous gel.

U.S. Pat. No. 4,613,631 discloses gels formed from crosslinked polymers for blocking of underground formations. The polymers may, for example, be polyacrylamide, polyacrylic acids, or else biopolymers, for example xanthogenates. The crosslinkers used are organic compounds which have at least two positively charged nitrogen atoms.

U.S. Pat. No. 7,150,319 B2 discloses a process for blocking underground formations, in which a copolymer comprising 2-acrylamido-2-methylpropanesulfonic acid, acrylamide, a further nitrogen-containing monomer, for example N-vinylformamide or N-vinylpyrrolidone, and vinylphosphonic acid as monomers. The copolymer is crosslinked with compounds of chromium, zirconium, titanium or aluminum to form a viscous gel.

U.S. Pat. No. 6,803,348 B2 discloses a process for reducing water production from mineral oil-bearing underground formations, in which water-soluble, hydrophobically associating copolymers comprising a linear hydrophilic main chain, hydrophobic side groups and functional groups which can be used for crosslinking are used. The water-soluble copolymers are injected into the underground formation and crosslinked therein, for example by means of Cr(III) ions, Zr(IV) ions or aldehydes. The polymers are preferably based on polyacrylamides. The hydrophobic groups are preferably alkyl groups having at least 6, preferably at least 8 and more preferably at least 12 carbon atoms. The copolymer may comprise, for example, N-alkylacrylamides, for example N-decylacrylamide, as a monomer.

WO 2010/133527 A2 discloses hydrophobically associating copolymers which comprise at least hydrophilic, monoethylenically unsaturated monomers, for example acrylamide, and monoethylenically unsaturated, hydrophobically associating monomers. The hydrophobically associating monomers have a block structure and have—in this sequence—an ethylenically unsaturated group, optionally a linking group, a first polyoxyalkylene block which comprises at least 50 mol % of ethyleneoxy groups, and a second polyoxyalkylene block which consists of alkyleneoxy groups having at least 4 carbon atoms. The application discloses the use of such copolymers as thickeners, for example for polymer flooding, for construction chemical applications, or for detergent formulations.

WO 2011/015520 A1 discloses a process for preparing hydrophobically associating copolymers by polymerizing water-soluble, monoethylenically unsaturated, surface-active monomers and monoethylenically unsaturated hydrophilic monomers in the presence of surfactants, and the use of such copolymers for polymer flooding.

Our prior applications EP 10192323.3, EP 10192334.0 and EP 10192316.7 disclose the use of the hydrophobically associating copolymers disclosed in WO 2010/133527 A2 in specific processes for polymer flooding.

However, none of the latter cited applications discloses the use of such hydrophobically associating copolymers for blocking of underground mineral oil-bearing formations.

A SUMMARY OF THE INVENTION

It was an object of the invention to provide an improved process for blocking of highly permeable regions of mineral oil-bearing formations.

Accordingly, a process has been found for producing mineral oil from underground mineral oil deposits, which comprises at least the following process steps:

(1) blocking permeable regions of the underground mineral oil deposit by injecting an aqueous formulation into the formation through at least one well, said aqueous formulation comprising at least one water-soluble, hydrophobically associating copolymer, and (2) injecting an aqueous flooding medium into at least one injection well and withdrawing mineral oil through the at least one production well, and wherein the water-soluble, hydrophobically associating copolymer comprises (a) 0.1 to 15% by weight of at least one monoethylenically unsaturated, hydrophobically associating monomer (a) selected from the group of

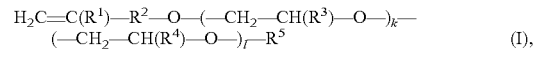

(I),

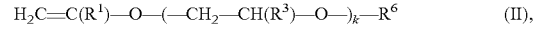

(II),

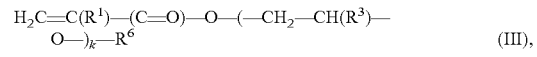

(III), where the —(—CH$_2$—CH(R$^3$)—O—)$_k$ and —(—CH$_2$—CH(R$^4$)—O—)$_l$ units are arranged in block structure in the sequence shown in formula (I) and the radicals and indices are each defined as follows:

k: a number from 10 to 150, l: a number from 5 to 25,

R$^1$: H or methyl,

R$^2$: a single bond or a divalent linking group selected from the group of —(C$_n$H$_{2n}$)—[R$^{2a}$], —O—(C$_n$H$_{2n'}$)—[R$^{2b}$] and —C(O)—O—(C$_{n''}$H$_{2n''}$)—[R$^{2c}$], where n, n' and n" are each natural numbers from 1 to 6, R$^3$: each independently H, methyl or ethyl, with the proviso that at least 50 mol % of the R$^3$ radicals are H, R$^4$: each independently a hydrocarbyl radical having at least 2 carbon atoms or an ether group of the general formula —CH$_2$—O—R$^{4'}$, where R$^{4'}$ is a hydrocarbyl radical having at least 2 carbon atoms, R[5]: H or a hydrocarbyl radical having 1 to 30 carbon atoms, R[6]: an aliphatic and/or aromatic, straight-chain or branched hydrocarbyl radical having 8 to 40 carbon atoms, and also (b) 85 to 99.9% by weight of at least two monoethylenically unsaturated monomers (b) different than (a), where the monomers (b) comprise (b1) at least one uncharged, monoethylenically unsaturated, hydrophilic monomer (b1), selected from the group of (meth)acrylamide, N-methyl(meth)acrylamide, N,N'-dimethyl(meth)acrylamide or N-methylol(meth)acrylamide, and (b2) at least one monomer (b2a) and/or (b2b), where the monomers (b2a) and (b2b) are defined as follows:

(b2a) anionic, monoethylenically unsaturated, hydrophilic monomers which have at least one acidic group selected from the group of —COOH, —$SO_3H$ and —$PO_3H_2$ and salts thereof, (b2b) (meth)acrylic esters of the general formula $H_2C=C(R^{15})$—$COOR^{16}$ where $R^{15}$ is H or methyl and $R^{16}$ is a straight-chain or branched alkyl radical having 1 to 8 carbon atoms, with the proviso that the amount of the monomers (b2b), if present, does not exceed 20% by weight, where the proportions are each based on the total amount of all monomers in the copolymer, the copolymer has a weight-average molecular weight $M_w$ of $0.5*10^6$ g/mol to $30*10^6$ g/mol, the amount of the copolymer in the aqueous formulation is 0.1 to 3% by weight, and the deposit temperature is 20° C. to 120° C.

A BRIEF DESCRIPTION OF THE FIGURE

FIG. 1 illustrates the results of the viscosity measurements.

A DETAILED DESCRIPTION OF THE INVENTION

With regard to the invention, the following should be stated specifically:

The process according to the invention comprises at least two process steps, (1) and (2).

In process step (1), permeable regions of the underground mineral oil deposit are blocked by injecting an aqueous formulation through at least one well sunk into the formation, said aqueous formulation comprising at least one water-soluble, hydrophobically associating copolymer. The term "blocking" means here that the permeable regions are completely or at least partially blocked. "Partially blocked" is intended to mean that the flow resistance of the permeable regions for aqueous media increases due to the treatment with the aqueous formulation of the copolymer. This can occur, for example, as a result of the copolymer forming a gel in the permeable regions of the formation and blocking them, or it can occur as a result of the copolymer forming a coating on the inner surface of cavities in the formation and this constriction of the flow paths increasing the flow resistance in the permeable regions.

In process step (2), mineral oil is actually produced by injecting an aqueous flooding medium into at least one injection well and withdrawing mineral oil through at least one production well. The injected aqueous flooding medium maintains the pressure and forces the mineral oil from the injection wells in the direction of the production wells.

The result of the performance of process step (1) here, i.e. the blocking of permeable zones, is that the flooding medium injected in process step (2) is forced also to flow through less permeable, as yet unexploited regions of the underground formation. As a result, the mineral oil yield is increased and water production is reduced.

Process steps (1) and (2) can also be performed more than once in the context of the process according to the invention, and the process according to the invention may of course comprise further process steps.

Deposits

The mineral oil deposits to which the process according to the invention is applied may be deposits for all kinds of oil, for example those for light or heavy oil.

In addition to mineral oil and possibly natural gas, the deposits generally comprise deposit water with a greater or lesser salt content. Typical salts in deposit waters comprise especially alkali metal salts and alkaline earth metal salts. Examples of typical cations comprise $Na^+$, $K^+$, $Mg^{2+}$ and $Ca^{2+}$, and examples of typical anions comprise chloride, bromide, hydrogencarbonate, sulfate or borate. The process according to the invention is especially suitable for deposits with a total amount of all salts in the deposit water of 20 000 ppm to 350 000 ppm (parts by weight), preferably 100 000 ppm to 250 000 ppm. The amount of alkaline earth metal ions in the deposit water may especially be 1000 to 53 000 ppm.

The mineral oil deposits have inhomogeneous permeability. This is understood to mean that the permeability is not the same in all regions of the deposit, and that the deposit instead has regions of higher and lower permeability. Regions of higher permeability may be caused, for example, by the fact that the deposits have larger pores in this region, or else by the fact that the deposits have fractures, cracks, fissures or the like. In the course of continued injection of water into the formation to maintain the pressure, called water flooding, the water injected, due to the low flow resistance, flows preferentially through the regions of high permeability.

The deposit may also have different rock layers of different permeability arranged one on top of another. For example, a deposit may comprise a comparatively permeable layer essentially comprising water, and a lower, less permeable layer comprising mineral oil.

The deposit temperatures ($T_L$) are in the range from 20° C. to 120° C., especially 30° C. to 120° C., preferably 35° C. to 110° C., more preferably 40° C. to 100° C., even more preferably 45° C. to 90° C. and, for example, 50° C. to 75° C. It will be clear to the person skilled in the art that a mineral oil deposit may also have a certain temperature distribution. The deposit temperature mentioned relates to the region of the deposit between the injection and production wells, i.e. the region covered by process steps (1) and (2). The temperature distribution can generally be undertaken from temperature measurements at particular sites in the formation in combination with simulation calculations, the simulation calculations taking account of factors including amounts of heat introduced into the formation and the amounts of heat removed from the formation.

To execute process step (1) of the process according to the invention, at least one well is sunk into the mineral oil deposit, through which the aqueous copolymer formulation can be injected to block permeable regions. This may be a well which has been sunk specially for process step (1). It is preferably an injection well and/or a production well which can also be used for process step (2) and/or has already been used in preceding water flooding.

To execute process step (2), at least one production well and at least one injection well are sunk into the mineral oil deposit. In general, a deposit is provided with several injection wells and with several production wells. Aqueous formulations can be injected into the mineral oil deposit through the at least one injection well, and the production wells serve to withdraw mineral oil from the mineral oil deposit. The term "mineral oil" in this context does not of course mean only single-phase oil, but instead the term also comprises the customary crude oil-water emulsions wherein the water may either be deposit water or injected water which has penetrated as far as the production well.

The wells which can be used for process step (1) may preferably be the injection and/or production wells which are also used for process step (2).

Process Step (1)

In process step (1), an aqueous formulation comprising at least one water-soluble, hydrophobically associating copolymer is used. In addition to the at least one copolymer, the formulation may optionally comprise further components.

Hydrophobically Associating Copolymers Used

The term "hydrophobically associating copolymers" is known in principle to those skilled in the art.

They comprise water-soluble copolymers which, as well as hydrophilic molecular components, have hydrophobic groups. In aqueous solution, the hydrophobic groups can associate with themselves or with other substances having hydrophobic groups due to intermolecular forces. This gives rise to a polymeric network joined by intermolecular forces, which thickens the aqueous medium.

In the ideal case, the copolymers used in accordance with the invention should be miscible with water in any ratio. According to the invention, however, it is sufficient when the copolymers are water-soluble at least at the desired use concentration and at the desired pH. In general, the solubility in water at room temperature under the use conditions should be at least 35 g/l.

According to the invention, the water-soluble, hydrophobically associating copolymer used comprises 0.1 to 15% by weight of at least one monoethylenically unsaturated, hydrophobically associating monomer (a) and 85 to 99.9% by weight of at least two monoethylenically unsaturated, hydrophilic monomers (b) different than (a). In addition, it is optionally possible for further, ethylenically unsaturated, preferably monoethylenically unsaturated, monomers (c) different than the monomers (a) and (b) to be present in an amount of up to 14.9% by weight. The amounts mentioned are each based on the sum of all monomers in the copolymer. Preference is given to using exclusively monoethylenically unsaturated monomers.

Monomers (a)

The water-soluble, hydrophobically associating copolymer used comprises at least one monoethylenically unsaturated monomer (a) which imparts hydrophobically associating properties to the copolymer and shall therefore be referred to hereinafter as "hydrophobically associating monomer". According to the invention, the monomers (a) are selected from the group of

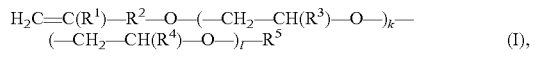

(I),

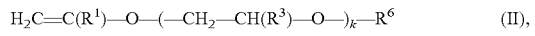

(II),

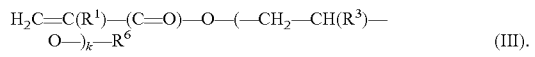

(III).

Monomers (a) of the Formula (I)

In the monomers (a) of the formula (I), an ethylenic group $H_2C=C(R^1)$— is bonded via a divalent linking group —$R^2$—O— to a polyoxyalkylene radical with block structure —(—$CH_2$—$CH(R^3)$—O—)$_k$—(—$CH_2$—$CH(R^4)$—O—)$_l$—$R^5$, where the two blocks —(—$CH_2$—$CH(R^3)$—O—)$_k$ and —$CH_2$—$CH(R^4)$—O—)$_l$ are arranged in the sequence shown in formula (I). The polyoxyalkylene radical has either a terminal OH group or a terminal ether group —$OR^5$.

In the abovementioned formula, $R^1$ is H or a methyl group.

$R^2$ is a single bond or a divalent linking group selected from the group of —($C_nH_{2n}$)—[$R^{2a}$ group], —O—($C_{n'}H_{2n'}$)—[$R^{2b}$ group]- and —C(O)—O—($C_{n''}H_{2n''}$)—[$R^{2c}$ group]. In the formulae mentioned, n, n' and n" are each a natural number from 1 to 6. In other words, the linking group comprises straight-chain or branched aliphatic hydrocarbyl groups having 1 to 6 hydrocarbon atoms, which are joined to the ethylenic group $H_2C=C(R^1)$— directly, via an ether group —O— or via an ester group —C(O)—O—. The —($C_nH_{2n}$)—, —($C_{n'}H_{2n'}$)— and —($C_{n''}H_{2n''}$)— groups are preferably linear aliphatic hydrocarbyl groups.

The $R^{2a}$ group is preferably a group selected from —$CH_2$—, —$CH_2$—$CH_2$— and —$CH_2$—$CH_2$—$CH_2$—, more preferably a methylene group —$CH_2$—.

The $R^{2b}$ group is preferably a group selected from —O—$CH_2$—$CH_2$—, —O—$CH_2$—$CH_2$—$CH_2$— and —O—$CH_2$—$CH_2$—$CH_2$—$CH_2$—, more preferably —O—$CH_2$—$CH_2$—$CH_2$—$CH_2$—.

The $R^{2c}$ group is preferably a group selected from —C(O)—O—$CH_2$—$CH_2$—, —C(O)O—$CH(CH_3)$—$CH_2$—, —C(O)O—$CH_2$—$CH(CH_3)$—, —C(O)O—$CH_2$—$CH_2$—$CH_2$— and —C(O)O—$CH_2$—$CH_2$—$CH_2$—$CH_2$—$CH_2$—$CH_2$—, more preferably —C(O)—O—$CH_2$—$CH_2$— and —C(O)O—$CH_2$—$CH_2$—$CH_2$—$CH_2$—, and most preferably —C(O)—O—$CH_2$—$CH_2$—.

The $R^2$ group is more preferably an $R^{2a}$ or $R^{2b}$ group, more preferably an $R^{2b}$ group.

In addition, $R^2$ is more preferably a group selected from —$CH_2$— and —O—$CH_2$—$CH_2$—$CH_2$—$CH_2$—, most preferably —O—$CH_2$—$CH_2$—$CH_2$—$CH_2$—.

The monomers (I) also have a polyoxyalkylene radical which consists of the units —(—$CH_2$—$CH(R^3)$—O—)$_k$ and —(—$CH_2$—$CH(R^4)$—O—)$_l$ where the units are arranged in block structure in the sequence shown in formula (I). The transition between the two blocks may be abrupt or else continuous.

In the —(—$CH_2$—$CH(R^3)$—O—)$_k$ block, the $R^3$ radicals are each independently H, methyl or ethyl, preferably H or methyl, with the proviso that at least 50 mol % of the $R^3$ radicals are H. Preferably at least 75 mol % of the $R^3$ radicals are H, more preferably at least 90 mol %, and they are most preferably exclusively H. The block mentioned is thus a polyoxyethylene block which may optionally also have certain proportions of propylene oxide and/or butylene oxide units, preferably a pure polyoxyethylene block.

The number of alkylene oxide units k is a number from 10 to 150, preferably 12 to 100, more preferably 15 to 80, even more preferably 20 to 30 and, for example, approx. 22 to 25. It is clear to the person skilled in the art in the field of the polyalkylene oxides that the numbers mentioned are averages of distributions.

In the second, terminal —(—$CH_2$—$CH(R^4)$—O—)$_l$— block, the $R^4$ radicals are each independently hydrocarbyl radicals of at least 2 carbon atoms, preferably at least 3, more preferably 3 to 10 and most preferably 3 to 4 carbon atoms. This may be an aliphatic and/or aromatic, linear or branched carbon radical. It is preferably an aliphatic radical.

Examples of suitable $R^4$ radicals comprise ethyl, n-propyl, n-butyl, n-pentyl, n-hexyl, n-heptyl, n-octyl, n-nonyl or n-decyl, and phenyl. Examples of preferred radicals comprise n-propyl, n-butyl, n-pentyl, particular preference being given to an n-propyl radical.

The $R^4$ radicals may also be ether groups of the general formula $-CH_2-O-R^{4'}$ where $R^{4'}$ is an aliphatic and/or aromatic, linear or branched hydrocarbyl radical having at least 2 carbon atoms, preferably at least 3 and more preferably 3 to 10 carbon atoms. Examples of $R^{3'}$ radicals comprise n-propyl, n-butyl, n-pentyl, n-hexyl, 2-ethylhexyl, n-heptyl, n-octyl, n-nonyl, n-decyl or phenyl.

The $-(-CH_2-CH(R^4)-O-)_l-$ block is thus a block which consists of alkylene oxide units having at least 4 carbon atoms, preferably at least 5 carbon atoms, and/or glycidyl ethers having an ether group of at least 2, preferably at least 3, carbon atoms. Preferred $R^3$ radicals are the hydrocarbyl radicals mentioned; the units of the second terminal block are more preferably alkylene oxide units comprising at least 5 carbon atoms, such as pentene oxide units or units of higher alkylene oxides.

The number of alkylene oxide units l is a number from 5 to 25, preferably 6 to 20, more preferably 8 to 18, even more preferably 10 to 15 and, for example, approx. 12.

The $R^5$ radical is H or a preferably aliphatic hydrocarbyl radical having 1 to 30 carbon atoms, preferably 1 to 10 and more preferably 1 to 5 carbon atoms. $R^5$ is preferably H, methyl or ethyl, more preferably H or methyl and most preferably H.

In the monomers of the formula (I), a terminal monoethylenic group is joined to a polyoxyalkylene group with block structure, specifically firstly to a hydrophilic block having polyethylene oxide units, which is in turn joined to a second terminal hydrophobic block formed at least from butene oxide units, preferably at least pentene oxide units, or units of higher alkylene oxides, for example dodecene oxide. The second block has a terminal $-OR^5$-group, especially an OH-group. The terminal $-(-CH_2-CH(R^4)-O-)_l$ block with the $R^4$ radicals is responsible for the hydrophobic association of the copolymers prepared using the monomers (a). Etherification of the OH end group is an option which may be selected by the person skilled in the art according to the desired properties of the copolymer. A terminal hydrocarbyl group is, however, not required for the hydrophobic association, and the hydrophobic association also works with a terminal OH group.

It is clear to the person skilled in the art in the field of polyalkylene oxide block copolymers that the transition between the two blocks, according to the method of preparation, may be abrupt or else continuous. In the case of a continuous transition, there is a transition zone between the two blocks, which comprises monomers of both blocks. When the block boundary is fixed at the middle of the transition zone, the first block $-(-CH_2-CH(R^3)-O-)_k$ may accordingly also have small amounts of $-CH_2-CH(R^4)-O-$ units and the second block $-(-CH_2-CH(R^4)-O-)_l-$ small amounts of $-CH_2-CH(R^3)-O-$ units, though these units are not distributed randomly over the block but arranged in the transition zone mentioned.

Preparation of the Monomers (a) of the Formula (I)

The hydrophobically associating monomers (a) of the formula (I) can be prepared by methods known in principle to those skilled in the art.

To prepare the monomers (a), a preferred preparation process proceeds from suitable monoethylenically unsaturated alcohols (IV) which are subsequently alkoxylated in a two-stage process such that the block structure mentioned is obtained. This gives monomers (a) of the formula (I) where $R^5$=H. These can optionally be etherified in a further process step.

The type of ethylenically unsaturated alcohols (IV) to be used is guided here especially by the $R^2$ group.

When $R^2$ is a single bond, the starting materials are alcohols (IV) of the general formula $H_2C=C(R^1)-O-(-CH_2-CH(R^7)-O-)_d-H$ (IVa) where $R^1$ is as defined above, $R^7$ is H and/or $CH_3$, preferably H, and d is a number from 1 to 5, preferably 1 or 2. Examples of such alcohols comprise diethylene glycol vinyl ether $H_2C=CH-O-CH_2-CH_2-O-CH_2-CH_2-OH$ or dipropylene glycol vinyl ether $H_2C=CH-O-CH_2-CH(CH_3)-O-CH_2-CH(CH_3)-OH$, preferably diethylene glycol vinyl ether.

To prepare monomers (a) in which $R^2$ is not a single bond, it is possible to use alcohols of the general formula $H_2C=C(R^1)-R^2-OH$ (IVb) or alcohols which already have alkoxy groups and are of the formula $H_2C=C(R^1)-R^2-O-(-CH_2-CH(R^7)-O-)_d-H$ (IVc), where $R^7$ and d are each as defined above, and $R^2$ in each case is selected from the group of $R^{2a}$, $R^{2b}$ and $R^{2c}$.

The preparation of the monomers with a linking $R^{2a}$ group preferably proceeds from alcohols of the formula $H_2C=C(R^1)-(C_nH_{2n})-OH$, especially $H_2C=CH-(C_nH_{2n})-OH$, or alcohols of the formula $H_2C=C(R^1)-O-(-CH_2-CH(R^7)-O-)_d-H$. Examples of preferred alcohols comprise allyl alcohol $H_2C=CH-CH_2-OH$ or isoprenol $H_2C=C(CH_3)-CH_2-CH_2-OH$.

The preparation of the monomers with a linking $R^{2b}$ group proceeds from vinyl ethers of the formula $H_2C=C(R^1)-O-(C_nH_{2n'})-OH$, preferably $H_2C=CH-O-(C_nH_{2n'})-OH$. It is more preferably possible to use w-hydroxybutyl vinyl ether $H_2C=CH-O-CH_2-CH_2-CH_2-CH_2-OH$.

The preparation of the monomers with a linking $R^{2c}$ group proceeds from hydroxyalkyl (meth)acrylates of the general formula $H_2C=C(R^1)-C(O)-O-(C_{n''}H_{2n''})-OH$, preferably $H_2C=C(R^1)-C(O)-O-(C_{n''}H_{2n''})-OH$. Examples of preferred hydroxyalkyl (meth)acrylates comprise hydroxyethyl (meth)acrylate $H_2C=C(R^1)-C(O)-O-CH_2-CH_2-OH$ and hydroxybutyl (meth)acrylate $H_2C=C(R^1)-C(O)-O-CH_2-CH_2-CH_2-CH_2-OH$.

The starting compounds mentioned are alkoxylated, specifically in a two-stage process, first with ethylene oxide, optionally in a mixture with propylene oxide and/or butylene oxide, and in a second step with alkylene oxides of the general formula (Xa) or (Xb)

where $R^4$ in (Xa) and $R^{4'}$ in (Xb) are each as defined at the outset.

The performance of an alkoxylation including the preparation of block copolymers from different alkylene oxides is known in principle to those skilled in the art. It is likewise known to those skilled in the art that the reaction conditions, especially the selection of the catalyst, can influence the molecular weight distribution of the alkoxylates and the orientation of alkylene oxide units in a polyether chain.

The alkoxylates can be prepared, for example, by base-catalyzed alkoxylation. For this purpose, the alcohol used as the starting material can be admixed in a pressure reactor with alkali metal hydroxides, preferably potassium hydroxide, or with alkali metal alkoxides, for example sodium methoxide. By means of reduced pressure (e.g. <100 mbar) and/or increasing the temperature (30 to 150° C.), water still present in the mixture can be removed. Thereafter, the alcohol is present as the corresponding alkoxide. This is followed by inertization with inert gas (e.g. nitrogen) and, in a first step, stepwise addition of ethylene oxide, optionally in a mixture with propylene oxide and/or butylene oxide, at temperatures of 60 to 180° C., preferably 130 to 150° C. The addition is typically effected within 2 to 5 h, though the invention should not be restricted thereto. After the addition has ended, the reaction mixture is appropriately allowed to continue to react, for example for ½ h to 1 h. In a second step, alkylene oxides of the general formula (Xb) are subsequently metered in stepwise. The reaction temperature in the second stage can be maintained or else altered. A reaction temperature lower by approx. 10 to 25° C. than in the first stage has been found to be useful.

The alkoxylation can also be undertaken by means of techniques which lead to narrower molecular weight distributions than the base-catalyzed synthesis. For this purpose, the catalysts used may, for example, be double hydroxide clays as described in DE 43 25 237 A1. The alkoxylation can more preferably be effected using double metal cyanide catalysts (DMC catalysts). Suitable DMC catalysts are disclosed, for example, in DE 102 43 361A1, especially paragraphs [0029] to [0041] and the literature cited therein. For example, it is possible to use catalysts of the Zn—Co type. To perform the reaction, the alcohol used as the starting material can be admixed with the catalyst, and the mixture can be dewatered as described above and reacted with the alkylene oxides as described. Typically, not more than 250 ppm of catalyst based on the mixture are used, and the catalyst can remain in the product due to this small amount.

The alkoxylation can additionally also be undertaken under acid catalysis. The acids may be Brønsted or Lewis acids. To perform the reaction, the alcohol used as the starting material can be admixed with the catalyst, and the mixture can be dewatered as described above and reacted with the alkylene oxides as described. At the end of the reaction, the acidic catalyst can be neutralized by addition of a base, for example KOH or NaOH, and filtered off if required.

It is clear to the person skilled in the art in the field of the polyalkylene oxides that the orientation of the hydrocarbyl radicals $R^4$ and optionally $R^3$ may depend on the conditions of the alkoxylation, for example on the catalyst selected for the alkoxylation. The alkylene oxide groups can thus be incorporated into the monomer either in the —(—$CH_2$—$CH(R^4)$—O—) orientation or else in the inverse —(—$CH(R^4)$—$CH_2$—O—)— orientation. The description in formula (I) should therefore not be considered to be restricted to a particular orientation of the $R^3$ or $R^4$ groups.

When the terminal OH group of the monomers (a) of the formula (I) (i.e. $R^5$=H) is to be etherified, this can be accomplished with customary alkylating agents known in principle to those skilled in the art, for example alkyl sulfates. For etherification, it is especially possible to use dimethyl sulfate or diethyl sulfate.

The preferred preparation process described for the monomers (I) has the advantage that the formation of possibly crosslinking by-products is substantially avoided. Accordingly, it is possible to obtain copolymers with a particularly low gel content.

Monomers (a) of the Formulae (II) and (III)

In the monomers of the formulae (II) and (III), $R^1$, $R^3$ and k are each defined as already outlined.

$R^6$ is an aliphatic and/or aromatic, straight-chain or branched hydrocarbyl radical having 8 to 40 carbon atoms, preferably 12 to 32 carbon atoms. For example, it may comprise n-alkyl groups such as n-octyl, n-decyl or n-dodecyl groups, phenyl groups, and especially substituted phenyl groups. Substituents on the phenyl groups may be alkyl groups, for example $C_1$-$C_6$-alkyl groups, preferably styryl groups. Particular preference is given to a tristyrylphenyl group.

The hydrophobically associating monomers of the formulae (II) and (III) and the preparation thereof are known in principle to those skilled in the art, for example from EP 705 854 A1.

Amounts of Monomers (a)

The amount of the monoethylenically unsaturated, hydrophobically associating monomers (a) is 0.1 to 15% by weight, based on the total amount of all monomers in the copolymer, especially 0.1 to 10% by weight, preferably 0.2 to 5% by weight and more preferably 0.5 to 5% by weight and, for example, 0.5 to 2% by weight.

Particular preference is given to using monomers (a) of the general formula (I) to prepare the inventive copolymers.

Monomers (b)

Over and above the monomers (a), the hydrophobically associating copolymer used in accordance with the invention comprises at least two monoethylenically unsaturated monomers (b) different than (a). referred to hereinafter as (b1) and (b2).

The monomers (b1) are uncharged, hydrophilic monomers.

The monomers (b2) are anionic, hydrophilic monomers (b2a) and/or (meth)acrylic esters (b2b). The (meth)acrylic esters themselves are, according to the nature of the ester group, generally not hydrophilic, but can be hydrolyzed under formation conditions to form hydrophilic groups.

More preferably, the hydrophilic monomers (b1) and (b2a) used are miscible with water in any ratio, but it is sufficient for execution of the invention that the inventive, hydrophobically associating copolymer possesses the water solubility mentioned at the outset. In general, the solubility of the monomers (b1) and (b2a) in water at room temperature should be at least 50 g/l, preferably at least 150 g/l and more preferably at least 250 g/l.

According to the invention, the copolymer comprises at least one uncharged, monoethylenically unsaturated, hydrophilic monomer (b1) selected from the group of (meth)acrylamide, N-methyl(meth)acrylamide, N,N'-dimethyl(meth)acrylamide or N-methylol(meth)acrylamide. Preference is given to (meth)acrylamide, especially acrylamide. When mixtures of different monomers (b1) are used, at least 50 mol % of the monomers (b1) should be (meth)acrylamide, preferably acrylamide.

According to the invention, the copolymer used further comprises at least monomer (b2a) and/or (b2b).

Monomer (b2a) comprises hydrophilic, monoethylenically unsaturated anionic monomers which have at least one acidic group selected from the group of —COOH, —$SO_3H$ and —$PO_3H_2$ and salts thereof. Preference is given to monomers comprising COOH groups and/or —$SO_3H$ groups, particular preference to monomers comprising —$SO_3H$ groups. The monomers may of course also be the salts of the acidic monomers. Suitable counterions comprise especially alkali metal ions such as $Li^+$, $Na^+$ or $K^+$, and ammonium ions such as $NH_4^+$ or ammonium ions with organic radicals.

Examples of monomers comprising COOH groups comprise acrylic acid, methacrylic acid, crotonic acid, itaconic acid, maleic acid or fumaric acid. Preference is given to acrylic acid.

Examples of monomers comprising sulfo groups comprise vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid. Preference is given to vinylsulfonic acid, allylsulfonic acid or 2-acrylamido-2-methylpropanesulfonic acid, and particular preference to 2-acrylamido-2-methylpropanesulfonic acid.

Examples of monomers comprising phospho groups comprise vinylphosphonic acid, allylphosphonic acid, N-(meth)acrylamidoalkylphosphonic acids or (meth)acryloyloxyalkyl-phosphonic acids, preference being given to vinylphosphonic acid.

For the sake of completeness, it should be mentioned that the monomers (b1) can be hydrolyzed at least partly to (meth)acrylic acid under some circumstances in the course of preparation and use of the copolymers. The hydrolysis can of course also be undertaken deliberately by the person skilled in the art. The copolymers used in accordance with the invention may accordingly comprise (meth)acrylic acid units, even if (meth)acrylic acid itself has not been used for the synthesis. The tendency to hydrolysis of the monomers (b1) decreases with increasing content of sulfo groups. Accordingly, the presence of sulfo groups in the copolymer used in accordance with the invention is advisable. The monomers (b2b) are (meth)acrylic esters of the general formula $H_2C=C(R^{15})$—$COOR^{16}$. For example, $R^{16}$ may be methyl, ethyl, 1-propyl, 2-propyl, 1-butyl, 2-butyl, i-butyl, 1-pentyl, 1-hexyl, 1-heptyl or 1-octyl radicals.

$R^{15}$ here is H or methyl, preferably H. $R^{16}$ is a straight-chain or preferably branched alkyl radical having 1 to 8 carbon atoms.

$R^{16}$ is preferably a secondary alkyl radical —$CH(R^{17})(R^{17'})$, where $R^{17}$ and $R^{17'}$ are straight-chain or branched alkyl radicals, with the proviso that the total number of carbon atoms in the $R^{17}$ and $R^{17'}$ radicals is 2 to 7. Examples of such secondary alkyl radicals comprise 2-propyl, 2-butyl or 2-pentyl radicals.

Additionally preferably, $R^{16}$ is a tertiary alkyl radical —$C(R^{18})(R^{18'})(R^{18''})$, where $R^{18}$, $R^{18'}$, $R^{18''}$ are straight-chain or branched alkyl radicals, with the proviso that the total number of carbon atoms in the $R^{18}$, $R^{18'}$ and $R^{18''}$ radicals is 3 to 7. A particularly preferred tertiary alkyl radical is a t-butyl radical —$C(CH_3)_3$.

The ester groups of the (meth)acrylic esters (b2b) can, after being incorporated into the copolymer, be hydrolyzed to —COOH groups or salts thereof, especially under formation conditions, i.e. especially elevated temperature. This results in in situ formation of polymers comprising the units (b1) and (b2a). Esters having secondary and especially tertiary alkyl radicals are hydrolyzed more quickly than esters of primary alkyl radicals and are therefore particularly preferred.

The copolymers used in accordance with the invention may additionally optionally comprise at least one monoethylenically unsaturated, cationic monomer (b3) having ammonium ions.

Suitable cationic monomers (b3) comprise especially monomers having ammonium groups, especially ammonium derivatives of N-(w-aminoalkyl)(meth)acrylamides or w-aminoalkyl-(meth)acrylic esters, and also diallyldimethylammonium salts.

More particularly, monomers (b3) having ammonium groups may be compounds of the general formulae $H_2C=C(R^8)$—CO—$NR^9$—$R^{10}$—$NR^{11}_3{}^+X^-$ (Va) and/or $H_2C=C(R^8)$—COO—$R^{10}$—$NR^{11}_3{}^+X^-$ (Vb). In these formulae, $R^8$ is H or methyl, $R^9$ is H or a $C_1$-$C_4$-alkyl group, preferably H or methyl, and $R^{10}$ is a preferably linear $C_1$-$C_4$-alkylene group, for example a 1,2-ethylene group —$CH_2$—$CH_2$— or a 1,3-propylene group —$CH_2$—$CH_2$—$CH_2$—.

The $R^{11}$ radicals are each independently $C_1$-$C_4$-alkyl radicals, preferably methyl, or a group of the general formula —$R^{12}$—$SO_3H$ where $R^{12}$ is a preferably linear $C_1$-$C_4$-alkylene group or a phenyl group, with the proviso that generally not more than one of the $R^{11}$ substituents is a substituent having sulfo groups. More preferably, the three $R^{11}$ substituents are methyl groups, i.e. the monomer has a —$N(CH_3)_3{}^+$ group. $X^-$ in the above formula is a monovalent anion, for example $Cl^-$. $X^-$ may of course also be a corresponding fraction of a polyvalent anion, though this is not preferred. Examples of preferred monomers (b3) of the general formula (Va) or (Vb) comprise salts of 3-trimethylammoniopropyl (meth)acrylamides or 2-trimethylammonioethyl (meth)acrylates, for example the corresponding chlorides such as 3-trimethylammoniopropyl-acrylamide chloride (DIMAPAQUAT) and 2-trimethylammoniomethyl methacrylate chloride (MADAME-QUAT).

The copolymers used in accordance with the invention may additionally also comprise further monoethylenically unsaturated hydrophilic monomers (b4) different than the hydrophilic monomers (b1), (b2) and (b3). Examples of such monomers comprise monomers comprising hydroxyl groups and/or ether groups, for example hydroxyethyl (meth)acrylate, hydroxypropyl (meth)acrylate, allyl alcohol, hydroxyvinyl ethyl ether, hydroxyvinyl propyl ether, hydroxyvinyl butyl ether, or compounds of the formula $H_2C=C(R^1)$—COO—(—$CH_2$—$CH(R^{13})$—O—)$_b$—$R^{14}$ (VIa) or $H_2C=C(R^1)$—O—(—$CH_2$—$CH(R^{13})$—O—)$_b$—$R^{14}$ (VIb), where $R^1$ is as defined above and b is a number from 2 to 200, preferably 2 to 100. The $R^{13}$ radicals are each independently H, methyl or ethyl, preferably H or methyl, with the proviso that at least 50 mol % of the $R^{13}$ radicals are H. Preferably at least 75 mol % of the $R^{13}$ radicals are H, more preferably at least 90 mol %, and they are most preferably exclusively H. The $R^{14}$ radical is H, methyl or ethyl, preferably H or methyl. Further examples of monomers (b4) comprise N-vinyl derivatives, for example N-vinylformamide, N-vinylacetamide, N-vinylpyrrolidone or N-vinylcaprolactam, and vinyl esters, for example vinyl formate or vinyl acetate. N-Vinyl derivatives can be hydrolyzed after polymerization to give vinylamine units, and vinyl esters to give vinyl alcohol units.

Copolymers used with preference comprise monomers (b1) and (b2a), but no monomers (b2b).

Further copolymers used with preference comprise monomers (b1) and (b2b), but no monomers (b2a). As explained above, however, it is also possible in this case for the ester groups of the monomers (b2b) to be hydrolyzed to —COOH groups, especially under formation conditions, and so such copolymers may also have —COOH groups some time after employment.

The amount of all monomers (b) in the inventive copolymer is, in accordance with the invention, 85 to 99.9% by weight, based on the total amount of all monomers in the copolymer, preferably 90 to 99.8% by weight.

The amount of the uncharged, hydrophilic monomers (b1) here is generally 30 to 95% by weight, preferably 30 to 85% by weight and more preferably 30 to 70% by weight, based on the total amount of all monomers used.

When the copolymer comprises only uncharged monomers (b1) and anionic monomers (b2a), it has been found to be useful to use the uncharged monomers (b1) in an amount of 30 to 95% by weight and the anionic monomers (b2a) in an amount of 4.9 to 69.9% by weight, each amount being based on the total amount of all monomers used. In this embodiment, the monomers (b1) are preferably used in an amount of 30 to 80% by weight and the anionic monomers (b2a) in an amount of 19.9 to 69.9% by weight, and the monomers (b1) are more preferably used in an amount of 40 to 70% by weight and the anionic monomers (b2a) in an amount of 29.9 to 59.9% by weight.

When the copolymer comprises uncharged monomers (b1), anionic monomers (b2a) and cationic monomers (b3), it has been found to be useful to use the uncharged monomers (b1) in an amount of 30 to 95% by weight, and the anionic (b2a) and cationic (b3) monomers together in an amount of 4.9 to 69.9% by weight, with the proviso that the molar (b2a)/(b3) ratio is 0.7 to 1.3. The molar (b2a)/(b3) ratio is preferably 0.8 to 1.2 and, for example, 0.9 to 1.1. This measure makes it possible to obtain copolymers which are particularly insensitive to salt burden. In this embodiment, the monomers (b1) are preferably used in an amount of 30 to 80% by weight, and the anionic and cationic monomers (b2a)+(b3) together in an amount of 19.9 to 69.9% by weight, and the monomers (b1) are more preferably used in an amount of 40 to 70% by weight and the anionic and cationic monomers (b2a)+(b3) together in an amount of 29.9 to 59.9% by weight, where the molar ratio already mentioned should be observed in each case. The amount of the monomers (b2b) is judged by the person skilled in the art such that the water solubility of the copolymer is not impaired by the use of the monomers (b2b). The amount of the monomers (b2b) should therefore generally, if present, not exceed 20% by weight, based on the total amount of all monomers. The amount should preferably not exceed 10% by weight. It may, for example, be 0.5 to 5% by weight.

Monomers (c)

In addition to the hydrophilic monomers (a) and (b), the inventive copolymers may optionally comprise ethylenically unsaturated monomers different than the monomers (a) and (b), preferably monoethylenically unsaturated monomers (c). Of course, it is also possible to use mixtures of a plurality of different monomers (c).

Such monomers can be used for fine control of the properties of the copolymer used in accordance with the invention. If present at all, the amount of such optionally present monomers (c) may be up to 14.9% by weight, preferably up to 9.9% by weight, more preferably up to 4.9% by weight, based in each case on the total amount of all monomers. Most preferably, no monomers (c) are present.

The monomers (c) may, for example, be monoethylenically unsaturated monomers which have more hydrophobic character than the hydrophilic monomers (b1) and (b2a) and which are accordingly water-soluble only to a minor degree. In general, the solubility of the monomers (c) in water at room temperature is less than 50 g/l, especially less than 30 g/l. Examples of such monomers comprise N-alkyl- and N,N"-dialkyl(meth)acrylamides, where the number of carbon atoms in the alkyl radicals together is at least 3, preferably at least 4. Examples of such monomers comprise N-butyl(meth) acrylamide, N-cyclohexyl(meth)acrylamide or N-benzyl (meth)acrylamide.

Preparation of the Hydrophobically Associating Copolymers

The copolymers used in accordance with the invention can be prepared by methods known in principle to those skilled in the art, by free-radical polymerization of the monomers (a), (b) and optionally (c), for example by solution or gel polymerization in the aqueous phase.

For polymerization, the monomers (a), (b), optionally (c), initiators and optionally further assistants for polymerization are used in an aqueous medium.

In a preferred embodiment, the preparation is undertaken by means of gel polymerization in the aqueous phase. For gel polymerization, a mixture of the monomers (a), (b) and optionally (c), initiators and optionally further assistants with water or an aqueous solvent mixture is first provided. Suitable aqueous solvent mixtures comprise water and water-miscible organic solvents, where the proportion of water is generally at least 50% by weight, preferably at least 80% by weight and more preferably at least 90% by weight. Organic solvents in this context include especially water-miscible alcohols such as methanol, ethanol or propanol. Acidic monomers can be fully or partly neutralized before the polymerization. The concentration of all components except the solvents in the course of the polymerization is typically approx. 20 to 60% by weight, preferably approx. 30 to 50% by weight. The polymerization should especially be performed at a pH in the range from 5.0 to 7.5 and preferably at a pH of 6.0.

Polymerization in the Presence of a Nonpolymerizable, Interface-Active Compound

In a preferred embodiment of the invention, the copolymers used are prepared in the presence of at least one nonpolymerizable, surface-active compound (T).

The nonpolymerizable, surface-active compound (T) is preferably at least one nonionic surfactant, but anionic and cationic surfactants are also suitable to the extent that they do not take part in the polymerization reaction. They may especially be surfactants, preferably nonionic surfactants, of the general formula $R^{13}$—Y' where $R^{13}$ is a hydrocarbyl radical having 8 to 32, preferably 10 to 20 and more preferably 12 to 18 carbon atoms, and Y' is a hydrophilic group, preferably a nonionic hydrophilic group, especially a polyalkoxy group.

The nonionic surfactant is preferably an ethoxylated long-chain aliphatic alcohol which may optionally comprise aromatic components.

Examples include: $C_{12}C_{14}$-fatty alcohol ethoxylates, $C_{16}C_{18}$-fatty alcohol ethoxylates, $C_{13}$-oxo alcohol ethoxylates, $C_{10}$-oxo alcohol ethoxylates, $C_{13}C_{15}$-oxo alcohol ethoxylates, $C_{10}$-Guerbet alcohol ethoxylates and alkylphenol ethoxylates. Useful compounds have especially been found to be those having 5 to 20 ethyleneoxy units, preferably 8 to 18 ethyleneoxy units. It is optionally also possible for small amounts of higher alkyleneoxy units to be present, especially propyleneoxy and/or butyleneoxy units, though the amount in the form of ethyleneoxy units should generally be at least 80 mol % based on all alkyleneoxy units.

Especially suitable are surfactants selected from the group of the ethoxylated alkylphenols, the ethoxylated, saturated iso-C13-alcohols and/or the ethoxylated C10-Guerbet alcohols, where in each case 5 to 20 ethyleneoxy units, preferably 8 to 18 ethyleneoxy units, are present in alkoxy radicals.

Surprisingly, the addition of nonpolymerizable, interface-active compounds (T) during the polymerization leads to a distinct improvement in performance properties of the copolymer in polymer flooding. More particularly, the thickening action is increased and the gel content of the copolymer is also reduced. This effect can probably be explained as follows, without any intention that the invention thus be tied to this explanation. In the case of polymerization without the presence of a surfactant, the hydrophobically associating comonomers (a) form micelles in the aqueous reaction medium. In the polymerization, this leads to blockwise incorporation of the hydrophobically associating regions into the polymer. If, in accordance with the invention, an additional surface-active compound is present in the preparation of the copolymers, mixed micelles form. These mixed micelles comprise polymerizable and nonpolymerizable components. As a result, the hydrophobically associating monomers are then incorporated in relatively short blocks. At the same time, the number of these relatively short blocks is greater per polymer chain. Thus, the structure of the copolymers prepared in the presence of a surfactant differs from those without the presence of a surfactant.

The nonpolymerizable, interface-active compounds (T) can generally be used in an amount of 0.1 to 5% by weight, based on the amount of all monomers used.

The weight ratio of the nonpolymerizable, interface-active compounds (T) used to the monomers (a) is generally 4:1 to 1:4, preferably 2:1 to 1:2, more preferably 1.5:1 to 1:1.5 and, for example, approx. 1:1.

Performance of the Polymerization

For the polymerization, the components required are first mixed with one another. The sequence with which the components are mixed for polymerization is unimportant; what is important is merely that, in the preferred polymerization method, the nonpolymerizable, interface-active compound (T) is added to the aqueous polymerization medium before the initiation of the polymerization.

The mixture is subsequently polymerized thermally and/or photochemically, preferably at −5° C. to 80° C. If polymerization is effected thermally, preference is given to using polymerization initiators which can initiate the polymerization even at comparatively low temperature, for example redox initiators. The thermal polymerization can be undertaken even at room temperature or by heating the mixture, preferably to temperatures of not more than 50° C. The photochemical polymerization is typically undertaken at temperatures of −5 to 10° C. It is also possible to combine photochemical and thermal polymerization with one another, by adding both initiators for the thermal and photochemical polymerization to the mixture. In this case, the polymerization is first initiated photochemically at low temperatures, preferably −5 to +10° C. The heat of reaction released heats the mixture, which additionally initiates the thermal polymerization. By means of this combination, it is possible to achieve a conversion of more than 99%.

In a further preferred embodiment of the polymerization, it is also possible to perform the reaction with a mixture of a redox initiator system and a thermal initiator which does not decompose until relatively high temperatures. This may, for example, be a water-soluble azo initiator which decomposes within the temperature range from 40° C. to 70° C. The polymerization here is at first initiated at low temperatures of, for example, 0 to 10° C. by the redox initiator system. The heat of reaction released heats the mixture, and this additionally initiates the polymerization by virtue of the initiator which does not decompose until relatively high temperatures.

The gel polymerization is generally effected without stirring. It can be effected batchwise by irradiating and/or heating the mixture in a suitable vessel at a layer thickness of 2 to 20 cm. The polymerization gives rise to a solid gel. The polymerization can also be effected continuously. For this purpose, for example, a polymerization apparatus possessing a conveyor belt to accommodate the mixture to be polymerized is used. The conveyor belt is equipped with devices for heating and/or for irradiating with UV radiation. In this method, the mixture is poured onto one end of the belt by means of a suitable apparatus, the mixture is polymerized in the course of transport in belt direction, and the solid gel can be removed at the other end of the belt.

The gel obtained is preferably comminuted and dried after the polymerization. The drying should preferably be effected at temperatures below 100° C. To prevent conglutination, it is possible to use a suitable separating agent for this step. This gives the hydrophobically associating copolymer as granules or powder.

Further details of the performance of a gel polymerization are disclosed, for example in DE 10 2004 032 304 A1, paragraphs [0037] to [0041].

Since the polymer powder or granules obtained are generally used in the form of an aqueous solution in the course of application at the site of use, the polymer has to be dissolved in water on site. This may result in undesired lumps with the high molecular weight polymers described. In order to avoid this, it is possible to add an assistant which accelerates or improves the dissolution of the dried polymer in water to the inventive polymers as early as in the course of synthesis. This assistant may, for example, be urea.

The resulting copolymers preferably have a weight-average molecular weight $M_w$ of $1*10^6$ g/mol to $30*10^6$ g/mol, preferably $5*10^6$ g/mol to $20*10^6$ g/mol.

Aqueous Formulation for Process Step (1)

To execute the process, an aqueous formulation which comprises, in addition to water, at least the hydrophobically associating copolymer described is used. It is of course also possible to use mixtures of different hydrophobically associating copolymers.

As well as water, the formulation may also comprise water-miscible organic solvents, in which case the amount of the water should generally comprise at least 75% by weight, preferably at least 90% by weight and more preferably at least 95% by weight based on the sum of all solvents used. Very particular preference is given to using exclusively water as the solvent. The formulation can be made up in freshwater or else in water comprising salts. The formulation can preferably be prepared by initially charging the water, sprinkling in the copolymer as a powder and mixing it with the water, and is preferably made up at ambient temperature.

According to the invention, the concentration of the polymer in the formulation is 0.1 to 3% by weight based on the sum of all components of the aqueous formulation. The amount is preferably 0.5 to 3% by weight and more preferably 1 to 3% by weight.

The concentration of the copolymer and hence the viscosity of the formulation used can be determined by the person skilled in the art according to the conditions in the formation.

The formulation may optionally comprise further components, for example crosslinkers, biocides, stabilizers or salts.

Further components may especially be water-soluble crosslinkers which can bring about crosslinking of the hydrophobically associating copolymer under deposit conditions.

Crosslinkers may, for example, be water-soluble compounds comprising di-, tri- or tetravalent metal ions, for example compounds comprising Al(III), Cr(III) or Zr(IV) ions, for example chromium(III) acetate, aluminum(III) citrate, zirconium(IV) salts such as zirconium(IV) lactate or zirconium(IV) acetate. The crosslinkers may also be boric acid or salts thereof.

The crosslinkers may also be organic crosslinkers, for example aldehydes such as formaldehyde, glyoxal or glutaraldehyde, or organic compounds comprising at least two amino or ammonium groups, for example polyethyleneimines, polyvinylamine or polyetheramines.

The crosslinkers may also be microencapsulated crosslinkers in which the crosslinker is released only after the injection of the formulation into the formation.

The amounts of crosslinker are selected by the person skilled in the art according to the desired properties, for example the desired degree of crosslinking. The amount of crosslinker may, for example, be 1 to 10% by weight based on the amount of the polymer used.

Performance of Process Step (1)

The performance of process step (1) involves injecting the above-described aqueous formulation which comprises at least the hydrophobically associating copolymer described into the formation through at least one well.

Process step (1) can be executed as the first process step, and then process step (2) of the process according to the invention. Process step (1) can, however, also be executed only after a first performance of process step (2), especially after water flooding of the formation. This variant is advisable when water production has already risen significantly as a result of sustained water flooding.

The injection of the aqueous formulation can be undertaken by means of customary apparatus.

The formulation can be injected by means of customary pumps. The wells are typically lined with cemented steel pipes, and the steel pipes are perforated at the desired site. The formulation enters the mineral oil formation through the perforation in the well. In a manner known in principle, the pressure applied by means of the pumps fixes the flow rate of the formulation and hence also the shear stress with which the aqueous formulation enters the deposit. The process may of course also be performed when the well has not been lined. According to the type of underground formation and the regions to be blocked, a person skilled in the art selects suitable copolymers. The formation of a gel in the underground formation can, according to the copolymer, proceed with use of crosslinkers or else without the use of crosslinkers.

The copolymers used in accordance with the invention as a constituent of the aqueous formulation, especially those which comprise monomers (a), (b1) and (b2a), are notable for thermal thickening characteristics within particular temperature ranges, which means that the aqueous formulations are notable in that the viscosity thereof at room temperature is lower than at higher temperatures. In general, the viscosity passes through a maximum in the range from approx. 50 to 80° C. The details on this subject are given in the experimental section. Preferred copolymers for this application comprise, as well as the monomers (a) and (b1), monomers (b2a) having sulfo groups. These may more preferably be copolymers comprising monomers (a), acrylamide and 2-acrylamido-2-methylpropanesulfonic acid.

In a first preferred embodiment of the invention, permeable regions of the formation can therefore be blocked by exploiting the thermal thickening characteristics of the copolymers used. For this embodiment, no crosslinker need be added to the formulation.

In this first preferred embodiment, the temperature of the aqueous formulation before the injection should preferably be lower than the deposit temperature. "Before the injection" relates to the temperature of the formulation at the surface of the earth before it is injected into the well. The temperature of the aqueous formulation before the injection into the deposit is preferably less than 35° C., more preferably less than 30° C. and, for example, approx. 15° C. to 25° C.

In this preferred embodiment, the temperature of the aqueous formulation of the hydrophobically associating copolymer is lower than the deposit temperature. After entry into the mineral oil formation, the aqueous formulation naturally flows into the permeable regions of the formation with low flow resistance. Under the influence of the deposit temperature, the aqueous formulation heats up to an increasing degree and accordingly gradually increases in viscosity until ultimate formation of a gel which has such a high viscosity that the permeable regions of the formation are blocked. This variant is suitable especially for formations with a deposit temperature of more than 40° C., preferably more than 45° C., especially 40° C. to 100° C., preferably 45° C. to 90° C., more preferably 50° C. to 75° C. In this embodiment, the temperature of the aqueous formulation before injection into the deposit should be at least 10° C., preferably at least 20° C., lower than the deposit temperature.

The hydrophobically associating copolymers used in accordance with the invention, especially the already mentioned copolymers comprising monomers (a), (b1) and (b2a) also have shear-diluting characteristics, i.e. the viscosity thereof decreases with increasing shear. It is therefore advisable to inject the aqueous formulations with high flow rate. This retards the heating of the formulation, but the shear-diluting characteristics do not result in mechanical degradation of the copolymer on entry into the formation, and so it regains viscosity after the shear has declined.

In a second preferred embodiment of the invention, the shear rate on entry of the aqueous copolymer formulation into the formation is therefore at least 30 000 s$^{-1}$, preferably at least 60 000 s$^{-1}$ and more preferably at least 90 000 s$^{-1}$. The shear stress on entry into the formation can be calculated by the person skilled in the art in a manner known in principle on the basis of the Hagen-Poiseuille law using the area flowed through on entry into the formation, the mean pore radius and the volume flow rate. The average porosity of the formation can be calculated in a manner known in principle by measurements on drill cores. The greater the volume flow rate of aqueous formulation injected into the formation, the greater the shear stress will naturally be.

Copolymers particularly preferred for execution of the outlined embodiments 1 and 2 of the process comprise monomers (a) of the general formula $H_2C=CH-O-(CH_2)_{n'}-O-(-CH_2-CH_2-O-)_k-(-CH_2-CH(R^4)-O-)_l-H$ (Ia) where n' is 2 to 6, preferably 2 to 4 and more preferably 4. $R^4$ in the preferred variant is a hydrocarbyl radical having 3 to 10 carbon atoms, especially an n-propyl radical. In addition, in formula (Ia), k is a number from 20 to 30 and l is a number from 6 to 20, preferably 8 to 18. The amount of the monomers (a) of the formula (Ia) is 0.2 to 5% by weight, preferably 0.5 to 2% by weight. As monomer (b1) the copolymer preferred for embodiments 1 and 2 comprises 40 to 60% by weight of acrylamide, and as monomer (b2a) 35 to 55% by weight of a monomer (b2a) having sulfo groups, preferably 2-acrylamido-2-methylpropane-sulfonic acid or salts thereof. Particular preference is given to using exclusively monomers (b2a) having sulfo groups.

In a third preferred embodiment of the invention, a formulation which additionally comprises one or more crosslinkers which can bring about the crosslinking of the polymer under deposit conditions is used. The crosslinking reaction thus occurs only in the course of heating of the formulation to deposit temperature. For this purpose, the above-described crosslinkers can be used in the aqueous formulation. The crosslinking of the polymer improves the strength of the gel for blockage of the formation. For the third embodiment too, the copolymers particularly suitable for embodiments 1 and 2 can be used with preference.

For the third embodiment, it is particularly advantageously possible to use copolymers having COOH groups, or those which form COOH groups under formation conditions.

Copolymers which are particularly advantageous for this third embodiment are therefore those which comprise monomers (a), (b1) and (b2b). Preference is given especially to copolymers comprising monomers (a) of the general formula $H_2C=CH-O-(CH_2)_{n'}-O-(-CH_2-CH_2-O-)_k-(-CH_2-CH(R^4)_l-H$ (Ia). Preferred ranges for n', k, l and $R^4$ have already been specified above. (b1) is preferably acrylamide, and (b2b) especially comprises readily hydrolyzable esters with secondary or tertiary ester groups, especially t-butyl (meth)acrylate. Preferred amounts are 0.2 to 5% by weight of monomers (Ia), 70 to 99.7% by weight of (b1) and 0.1 to 10% by weight, preferably 0.2 to 5% by weight, of (b2b).

The mode of action of the crosslinkers is known in principle to those skilled in the art. In this regard, we make reference to the literature cited at the outset, for example from the review article Boiling et al. *"Pushing out the oil with Conformance Control"* in *Oilfield Review* (1994), pages 44 ff. What is essential is that crosslinking reactions do not proceed at a significant rate at room temperature, but only at higher temperatures, especially at temperatures of >50° C. At higher temperatures, $-CONR'_2$ and/or $-COOR^{16}$ groups present in the polymer can be hydrolyzed to $-COOH$ groups, and the $-COOH$ groups of different copolymer chains can crosslink with one another via complexation with metal ions present in the formulation. It is likewise possible for COOH groups to react with polyethyleneimines and/or forms salts, and thus crosslink the copolymers. The crosslinking forms a high-viscosity gel which blocks the formation.

In a fourth preferred embodiment of the invention, copolymers which also comprise cationic monomers (b3) as well as monomers (b1) and (b2a) are used in the aqueous formulation. Preferred copolymers for this fourth embodiment comprise 0.2 to 5% by weight, preferably 0.5 to 2% by weight, of monomers (a) of the general formula (Ia), and, as monomers (b1), 30 to 40% by weight of acrylamide. They additionally comprise 25 to 35% by weight of at least one monomer (b2a) having sulfo groups, preferably 2-acrylamido-2-methylpropanesulfonic acid or salts thereof, and 25 to 35% by weight of at least one cationic monomer having ammonium ions, preferably salts of dialkyldiallylammonium, 3-trimethylammoniopropyl(meth)acrylamides and 2-trimethylammonioethyl (meth)acrylates.

This embodiment can be used, for example, in silicatic formations, especially sandstone formations. However, it can of course also be used in other formations, for example carbonatic formations. Silicatic formations have anionic sites on the surface, which can interact well with the cationic sites of the copolymers used. It is thus possible to form a polymer film on the surface of the rock formation, which constricts free cross sections. Further polymer can be absorbed on the polymer-modified surface. It will be appreciated that this embodiment can also be combined with crosslinking of the copolymer. For this purpose, the crosslinkers already outlined can be used.

In a fifth preferred embodiment of the invention, the injection of the copolymer used in accordance with the invention is preceded by injection of an aqueous formulation of a polymer having cationic groups. Examples of suitable cationic polymers comprise poly(diallyldimethyl-ammonium chloride), poly(N-acrylamidopropyl-N,N,N-trimethylammonium chloride) or poly(N-methacrylatopropyl-N,N-dimethyl-N-benzylammonium chloride), or corresponding copolymers, for example with acrylamide as a comonomer.

After the injection of the cationic polymer, the aqueous formulation of the copolymer used in accordance with the invention is injected into the formation, and the surface is cationically modified as a result. The copolymer which has anionic groups and is used in accordance with the invention can be adsorbed efficiently on the cationically modified surface. In a preferred embodiment of the invention, the injection of aqueous formulations of a cationic polymer and of the copolymer used in accordance with the invention can be repeated once or more than once. In this way, a multilayer polymer film of ever greater thickness forms on the formation surface.

The aqueous copolymer formulation can be injected either through one or more injection wells and/or one or more production wells. This is guided by the specific conditions in the formation.

Injection into a production well is particularly advisable, for example, when a water-bearing stratum is arranged below a mineral oil-bearing stratum, and water is increasingly being produced from the water-bearing stratum. For injection into production wells, the injection of aqueous flooding media into the injection wells is generally stopped. Measures known in principle to those skilled in the art can ensure that the aqueous copolymer formulation is actually injected into the water-bearing zone and not into the oil-bearing zone. For example, through suitable lining of the well, steel pipes perforated exactly in the region of the water-bearing stratum can inject the copolymer formulation into the water-bearing stratum in a controlled manner. In addition, the penetration of polymer formulation into the oil-bearing stratum can be prevented by simultaneously injecting an inert protection fluid into the oil-bearing stratum.

In the case of injection into one or more injection wells, the aqueous copolymer formulation naturally flows into the permeable regions of the formation with low flow resistance, and hence exactly through the regions which are to be blocked.

Process Step (2)

In process step (2), mineral oil is actually produced by injection of an aqueous flooding medium into the at least one injection well and withdrawing mineral oil through the at least one production well. The aqueous flooding medium injected maintains the pressure and forces the mineral oil from the injection wells in the direction of the production wells.

The aqueous flooding medium may preferably be water or salt-containing water. In this case, the process is called "water flooding". It is possible to inject either freshwater or saltwater. For example, seawater can be used for injection, for example in the case of production platforms, or it is possible to use produced formation water, which is reused in this manner. It may be cold water or hot water. The aqueous flooding media may, however, also be steam ("steam flooding"), aqueous formulations comprising surfactants ("surfactant flooding") or formulations comprising thickening polymers ("polymer flooding").

When process step (2) is executed repeatedly, the aqueous flooding media used in each case may be identical aqueous flooding media or have different compositions.

When step (1) is executed by injection into the injection wells, it is advisable to commence the process with the performance of step (1). This is followed by process step (2). If process step (2) has formed new preferential flow paths, these can be blocked by repetition of step (1), followed by continuation with step (2). It will be appreciated that it is also possible to repeat the sequence of steps (1) and (2) several times.

The blocking of permeable regions from the production well can advantageously be performed when water production has risen, i.e. after a first performance of process step (2). After the performance of process step (1), mineral oil production is repeated with the new performance of process step (2).

The examples which follow are intended to illustrate the invention in detail:

Preparation of the Monomer Used
Hydroxybutyl Vinyl Ether Alkoxylate with 22 EO Units and 12 PeO Units

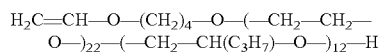

A 1 l stirred stainless steel autoclave is initially charged with 44.1 g of hydroxybutyl vinyl ether. Subsequently, 3.12 g of KOMe (32% in MeOH) are metered in and the methanol is drawn off at 80° C. and approx. 30 mbar. This is followed by heating to 140° C., purging of the reactor with nitrogen and establishment of a nitrogen pressure of 1.0 bar. Then 368 g of EO are metered in within approx. 3 h. After continued reaction at 140° C. for a half hour, the reactor is cooled to 125° C., and a total of 392 g of pentene oxide are metered in over the course of 3.5 h. The reaction continues overnight.

The product has an OH number of 31.9 mg KOH/g (theory: 26.5 mg KOH/g). The OH number is determined by means of the ESA method.

Preparation of Polymer 1 (Inventive):
Preparation of a Copolymer from 2% by Weight of Monomer M1, 50% by Weight of Acrylamide and 48% by Weight of 2-Acrylamido-2-Methylpropanesulfonic Acid (by Means of Gel Polymerization)

A plastic bucket with magnetic stirrer, pH meter and thermometer is initially charged with 121.2 g of a 50% aqueous solution of NaATBS (2-acrylamido-2-methylpropanesulfonic acid, sodium salt), and then 155 g of distilled water, 0.6 g of a defoamer (Surfynol® DF-58), 0.2 g of a silicone defoamer (Baysilon® EN), 2.3 g of monomer M1, 114.4 g of a 50% aqueous solution of acrylamide, 1.2 g of pentasodium diethylenetriaminepentaacetate (complexing agent, as a 5% aqueous solution) and 2.4 g of a nonionic surfactant (nonylphenol, alkoxylated with 10 units of ethylene oxide) are added successively.

After adjusting the pH with a 20% or 2% sulfuric acid solution to a value of 6 and adding the rest of the water, the monomer solution is adjusted to the start temperature of 5° C. The total amount of water is such that—after the polymerization—a solids concentration of approx. 30 to 36% by weight is attained. The solution is transferred to a thermos flask, a temperature sensor for the temperature recording is provided and the solution is purged with nitrogen for 30 minutes. The polymerization is then initiated by adding 1.6 ml of a 10% aqueous solution of a water-soluble cationic azo initiator 2,2'-azobis(2-amidinopropane) dihydrochloride (Wako V-50), 0.12 ml of a 1% aqueous solution of tert-butyl hydroperoxide and 0.24 ml of a 1% sodium sulfite solution. After the initiators have been added, the temperature rises to approx. 80° C. within 15 to 30 min. After 30 min, the reaction vessel is placed into a drying cabinet at approx. 80° C. for approx. 2 h to complete the polymerization. The total duration of the polymerization is approx. 2 h to 2.5 h. A gel block is obtained, which, after the polymerization has ended, is comminuted with the aid of a meat grinder. The gel granules obtained are dried in a fluidized bed dryer at 55° C. for two hours. This gives white, hard granules which are converted to a pulverulent state by means of a centrifugal mill. This gives a copolymer with a weight-average molecular weight of approx. $1*10^6$ g/mol to $30*10^6$ g/mol.

Comparative Polymer 1:
This is a commercially available copolymer for polymer flooding, formed from approx. 50% by weight of acrylamide and approx. 50% by weight of 2-acrylamido-2-methylpropanesulfonic acid with a weight-average molecular weight $M_w$ of approx. 8 to $13*10^6$ g/mol. In contrast to the copolymers used in accordance with the invention, it does not comprise any hydrophobically associating monomers.

Preparation of Polymer 2 (Inventive):
Preparation of a Copolymer from 2% by Weight of Monomer 1, 93% by Weight of Acrylamide and 5% by Weight of T-Butyl Acrylate A 2 l three-neck flask with stirrer and thermometer was initially charged with 337.5 g of water. 0.06 g of sodium hypophosphite, 0.5 g of ammonium persulfate and 7.46 g of butyl acrylate were added successively to the reaction flask. Then it was purged with nitrogen for 45 min. In parallel to this, a monomer solution consisting of 91.2 g of water, 272.56 g of 50 percent aqueous acrylamide solution, 1.03 g of 50 percent aqueous Trilon C solution, 2.93 g of monomer M1, 1.03 g of sodium dodecylsulfate, 0.1 g of sodium hypophosphite and 0.5 g of potassium bromate was prepared.

24.0 g of a 7 percent aqueous sodium sulfite solution were likewise prepared as an initiator solution. After the inertization, the monomer solution and the initiator solution were metered in in parallel with a peristaltic pump. The metering time of the monomer solution was 2 h, and that of the initiator solution 2.5 h. In the course of this, it was ensured that the internal temperature did not exceed 50° C. After the metered addition had ended, the mixture was heated to 60° C. Subsequently, 0.375 g of VA044 was added as a further initiator for residual monomer reduction, and the mixture was stirred at 60° C. for 1 h. Finally, 0.75 g of Acticide MBS was dissolved in 13.5 g of water and added. Then the mixture was cooled and transferred.

Preparation of Polymer 3 (Inventive):
Preparation of a Copolymer from 4% by Weight of Monomer 1, 91% by Weight of Acrylamide and 5% by Weight of T-Butyl Acrylate Polymer 3 was prepared like polymer 2, except that the amounts of the monomers were altered as follows:

| | |
|---|---|
| 50 percent aqueous acrylamide solution | 266.71 g |
| Butyl acrylate | 7.46 g |
| Monomer 1 | 5.85 g |

Preparation of Polymer 4 (Inventive):
Preparation of a Copolymer from 1% by Weight of Monomer 1, 94% by Weight of Acrylamide and 5% by Weight of T-Butyl Acrylate Polymer 4 was prepared like polymer 2, except that the amounts of the monomers were altered as follows:

| | |
|---|---|
| 50 percent aqueous acrylamide solution | 275.51 g |
| Butyl acrylate | 7.46 g |
| Monomer 1 | 1.46 g |

Preparation of Polymer 5 (Inventive):
Preparation of a Copolymer from 0.5% by Weight of Monomer 1, 94.5% by Weight of Acrylamide and 5% by Weight of T-Butyl Acrylate Polymer 5 was prepared like polymer 2, except that the amounts of the monomers were altered as follows:

Example Polymer 4:

| 50 percent aqueous acrylamide solution | 276.99 g |
|---|---|
| Butyl acrylate | 7.46 g |
| Monomer 1 | 0.73 g |

Preparation of Polymer 6 (Inventive):

Preparation of a Copolymer from 0.5% by Weight of Monomer 1, 95.5% by Weight of Acrylamide and 4% by Weight of Sodium Acrylate (by Means of Suspension Polymerization)

A 2 l jacketed reactor with stirrer and water separator is initially charged with 600 g of Exxsol D40, 4 g of a 25 percent solution of a polymeric stabilizer for water-in-oil suspensions are added and the mixture is heated to 35° C. In the course of which, inertization is effected by purging with nitrogen for 90 min. In a beaker, 310.40 g of a 50 percent aqueous acrylamide solution, 18.05 g of a 35 percent sodium acrylate solution, 0.6 g of a 50 percent aqueous Trilon C, 0.81 g of monomer 1 and 10.12 g of water are mixed. 10 percent sulfuric acid is used to adjust the pH to 6.0. Then 1.62 of a 10 percent aqueous solution of V50 (Wako) and 11.52 g of a 1 percent sodium sulfite solution are added to the monomer solution. The monomer solution is introduced into the inertized oil phase and stirred at 350 rpm for 4 min. Thereafter, 3.6 g of a 1 percent aqueous solution of tert-butyl hydroperoxide are added. The polymerization commences rapidly and reaches 85° C. after a few minutes. After 15 min, the mixture is heated to boiling and the water is distilled off by azeotropic means. After the complete removal of the water, the mixture is cooled to room temperature and filtered.

Preparation of Polymer 7 (Inventive):

Preparation of a Copolymer from 1% by Weight of Monomer 1, 95% by Weight of Acrylamide and 4% by Weight of Sodium Acrylate Polymer 7 was prepared like polymer 6, except that the amounts of the monomers were altered as follows:

| 50 percent aqueous acrylamide solution | 308.70 g |
|---|---|
| 35 percent aqueous sodium acrylate solution | 18.05 g |
| Monomer 1 | 1.62 g |

Preparation of Polymer 8 (Inventive):

Preparation of a Copolymer from 2% by Weight of Monomer 1, 94% by Weight of Acrylamide and 4% by Weight of Sodium Acrylate Polymer 8 was prepared like polymer 6, except that the amounts of the monomers were altered as follows:

| 50 percent aqueous acrylamide solution | 305.50 g |
|---|---|
| 35 percent aqueous sodium acrylate solution | 18.05 g |
| Monomer 1 | 3.24 g |

Preparation of Polymer 9 (Inventive):

Preparation of a Copolymer from 4% by Weight of Monomer 1, 92% by Weight of Acrylamide and 4% by Weight of Sodium Acrylate Polymer 9 was prepared like polymer 26, except that the amounts of the monomers were altered as follows:

| 50 percent aqueous acrylamide solution | 299.06 g |
|---|---|
| 35 percent aqueous sodium acrylate solution | 18.05 g |
| Monomer 1 | 6.48 g |

Preparation of Comparative Polymer 2:

Preparation of a Copolymer from 0.5% by Weight of Acrylic Acid, 39.5% by Weight of Acrylamide and 60% by Weight of 2-Acrylamido-2-Methylpropanesulfonic Acid Polymer C2 was prepared like polymer 6 (suspension polymerization), except that the abovementioned monomers were used in the amounts specified.

Preparation of Polymer 10 (Inventive)

Preparation of a Copolymer from 3.1% by Weight of Sodium Acrylate, 96.4% by Weight of Acrylamide and 0.5% by Weight of Monomer 1

The procedure was as in example 1 (gel polymerization), except that the abovementioned monomers were used in the amounts specified.

Preparation of Polymer 11 (Inventive)

Preparation of a Copolymer from 3.1% by Weight of Sodium Acrylate, 95.9% by Weight of Acrylamide and 1.0% by Weight of Monomer 1

The procedure was as in example 1 (gel polymerization), except that the abovementioned monomers were used in the amounts specified.

Preparation of Polymer 12 (Inventive)

Preparation of a copolymer from 3.1% by weight of sodium acrylate, 94.9% by weight of Acrylamide and 2.0% by Weight of Monomer 1

The procedure was as in example 1 (gel polymerization), except that the abovementioned monomers were used in the amounts specified.

Preparation of Polymer 13 (Inventive)

Preparation of a Copolymer from 3.1% by Weight of Sodium Acrylate, 92.8% by Weight of Acrylamide and 4.1% by Weight of Monomer 1

The procedure was as in example 1 (gel polymerization), except that the abovementioned monomers were used in the amounts specified.

Preparation of Comparative Polymer 3:

Preparation of a Copolymer from 3.1% by Weight of Sodium Acrylate, 96.9% by Weight of Acrylamide The procedure was as in example 1 (gel polymerization), except that the abovementioned monomers were used in the amounts specified. No monomer 1 was used.

Performance Tests of Polymers 1, 10 to 13 and C1, C2, C3:

In the test series which follow, the thermal thickening action of the polymers used is tested.

Test Series 1:

Solutions of polymers 1 and C1 were made up in a concentration of in each case 1200 ppm in tap water, and the viscosity of each of the solutions was measured at 30° C., 60° C., 90° C. and 120° C. FIG. 1 shows the result of the viscosity measurements.

It is clearly evident that the viscosity of the polymer used in accordance with the invention rises with rising temperature up to a viscosity maximum at 60° C. and then decreases again, while the comparative polymer has a falling viscosity with rising temperature. The polymer used in accordance with the invention can thus be injected into the mineral oil formation low temperatures, and follows the preferred flow paths. The viscosity increases in the course of heating under the sole influence of the deposit temperature and thus leads to the formation of a highly viscous gel in the flow paths.

Test Series 2:

A 2% solution of inventive polymer 1 in tap water was prepared. This solution was highly viscous but still free-flowing at room temperature, especially at high shear rates as occur in the course of pumping of the polymer solution. In the course of heating to 60° C. at a low shear rate, the viscosity of the polymer solution rose significantly and it was barely free-flowing any longer.

Test Series 3:

The Brookfield viscosity (in mPas) of solutions of 0.5% by weight of polymers 10 to 13 and C2 and C3 in fresh water and in a salt solution was measured at various temperatures.

The salt solution had the following composition:

| Salt | Amount [g/l] |
|---|---|
| NaCl | 23.5 |
| $Na_2SO_4 \ast 10\ H_2O$ | 8.9 |
| KCl | 0.7 |
| $MgCl_2 \ast 6\ H_2O$ | 10.6 |
| $CaCl_2 \ast 2\ H_2O$ | 2.2 |
| $NaHCO_3$ | 0.2 |
| Total | 46.1 |

The results are compiled in tables 1 and 2:

TABLE 1

Results of the viscosity measurements in fresh water

| | Viscosity η [m Pas] | | | | | |
|---|---|---|---|---|---|---|
| T [° C.] | Polymer 10 0.5% M1 | Polymer 11 1% M1 | Polymer 12 2% M1 | Polymer 13 4.1% M1 | C2 | C3 |
| 20 | 78 | 150 | 252 | 280 | 500 | 45 |
| 40 | 75 | 345 | 700 | 800 | 350 | 65 |
| 60 | 40 | 550 | 1860 | 1700 | 250 | 90 |
| 80 | | | 2750 | | | |

TABLE 2

Results of the viscosity measurements in salt water

| | Viscosity η [m Pas] | | | | | |
|---|---|---|---|---|---|---|
| T [° C.] | Polymer 10 0.5% M1 | Polymer 11 1% M1 | Polymer 12 2% M1 | Polymer 13 4.1% M1 | C2 | C3 |
| 20 | 120 | 170 | 390 | 155 | 40 | 85 |
| 40 | 180 | 470 | 1700 | 550 | 20 | 45 |
| 60 | 250 | 1000 | 2500 | 1000 | 15 | 30 |
| 80 | | | | 3300 | | |

The results show that the polymers which comprise monomer M1 and are to be used in accordance with the invention exhibit excellent thermal thickening characteristics in salt water. Comparative polymers C2 and C3 have only very low viscosities in salt water, and the viscosities decrease in the course of heating. Due to these properties, the polymers are outstandingly suitable for blocking of underground formations. The polymers can be injected efficiently at low viscosities and the viscosity increases very significantly underground.

Performance Tests of Polymers 2 to 9:
Measurement of Brookfield Viscosity

The Brookfield viscosity of each of the polymers used was measured in aqueous solution at room temperature. The results are compiled in tables 3 and 4 below.

TABLE 3

Viscosities of polymers 3 to 5

| Polymer No. | Composition acrylamide/tert-butyl acrylate/monomer M1 [in % by wt.] | Brookfield viscosity [mPas] at RT (aqueous solution, 20% by wt.) |
|---|---|---|
| 2 | 93/5/2 | 208 |
| 3 | 91/5/4 | 440 |
| 4 | 94/5/1 | 260 |
| 5 | 945/5/0.5 | 260 |

TABLE 4

Viscosities of polymers 6 to 9

| | Composition acrylamide/sodium | Brookfield Viscosity [mPas] in water at RT | |
|---|---|---|---|
| Polymer No. | acrylate/monomer M1 [in % by wt.] | 0.5% by weight of polymer | 1% by weight of polymer |
| 6 | 95.5/4/0.5 | 8 | 28 |
| 7 | 95/4/1 | 90 | 150 |
| 8 | 94/4/2 | 90 | 190 |
| 9 | 92/4/4 | 210 | 320 |

Production of Polymer Gels

In order to be able to test the properties of the polymers used with regard to gel formation properties under formation conditions, gel formulation was studied in seawater at 80° C. The combination of 80° C. and salt-containing water simulates the conditions in a typical mineral oil deposit.

The t-butyl ester units of copolymers 2 to 5 are hydrolyzed to an extent of approx. 50% at 80° C. in seawater within 2 h, and form COOH groups.

A synthetic seawater of the following composition was used:
500 g of deionized water
1.13 g of NaHCO3
13.60 g of CaCl2×6 H2O
28.34 g of MgCl2×6 H2O
39.70 g of MgSO4×6 H2O
158.72 g of NaCl In addition, crosslinkers were added in some experiments. The crosslinkers used were:
Crosslinker 1: 50% by weight aqueous chromium(III) acetate solution
Crosslinker 2: 33% by weight of aqueous polyethyleneimine solution, $M_w$ approx. 75 000 g/mol, pH 11.4 (Lupasol® PS)
Crosslinker 3: 40% by weight of aqueous polyethyleneimine solution, $M_w$ approx. 25 000 g/mol, pH 11.0 (Basomin® G 500)

The gel formation tests were conducted as follows.
100 ml of a 5% solution of the polymers in seawater (or in fresh water for comparative purposes) are initially charged in a screwtop bottle. If crosslinkers are used, the crosslinker is added by means of a plastic syringe and the screwtop bottle is closed. The bottle is shaken until the mixture is homogeneous and then placed in the drying cabinet at 80° C.

The sample is assessed visually at 5 minute intervals, by placing the bottle on its lid and assessing the flow characteristics of the contents and assigning a gel code. The time when gel code B is attained is noted. The appearance of the gels and the assignment of the gel codes is detailed below.

Gel Codes

A—no detectable gel formed. The gel appears to have the same viscosity (fluidity) as the original polymer solution, and no gel can be discovered visually.

B—highly mobile gel. The gel appears to be only a bit tackier than the original polymer solution of relatively low viscosity.

C—flowing gel. The majority of the obviously detectable gel flows into the bottle lid and back.

D—moderately flowing gel. A small amount (~5-15%) of the gel flows into the bottle lid and back, usually characterized as a 'tonguing' gel (i.e. once the gel hangs out of the bottle, it can flow back into the bottle when the bottle is slowly turned upright).

E—barely flowing gel. The gel flows slowly into the bottle lid and/or a significant portion (>15%) of the gel does not flow into the bottle lid and back.

F—highly deformable gel. The gel does not flow into the bottle lid and back (gel barely flows to reach the bottle lid).

G—moderately deformable non-flowing gel. Half of the gel flows to the bottle lid and back.

H—an only slightly deformable, non-flowing gel. The gel surface deforms slightly and the deformation is reversed again.

I—rigid gel. There is no longer any gel surface deformation.

J—the ringing of rigid gel. After knocking on the bottle, the gel rings like a tuning fork and mechanical vibration can be perceived.

The results and test conditions for polymers 2 to 5 are shown in table 5 below, and the results for polymers 6 to 9 in table 6 below.

TABLE 5

Gel formation tests at 80° C., test conditions and results

| Polymer No. | Amount of polymer [% by wt.] | Medium | Crosslinker | Gel code B after [min] | Gel code J after [min] |
|---|---|---|---|---|---|
| 2 | 5 | Fresh water | Crosslinker1/250 ppm | 45 | 55 |
| 3 | 5 | Fresh water | Crosslinker1/250 ppm | 60 | 70 |
| 4 | 5 | Fresh water | Crosslinker1/250 ppm | 55 | 65 |
| 5 | 5 | Fresh water | Crosslinker1/250 ppm | 55 | 70 |
| 2 | 5 | Seawater | Crosslinker 1/250 ppm | 50 | 60 |
| 3 | 5 | Seawater | Crosslinker 1/250 ppm | 65 | 70 |
| 4 | 5 | Seawater | Crosslinker 1/250 ppm | 55 | 70 |
| 5 | 5 | Seawater | Crosslinker 1/250 ppm | 50 | 75 |
| 2 | 5 | Fresh water | Crosslinker 2/2000 ppm | 3 h 10 min | 3 h 30 min |
| 3 | 5 | Fresh water | Crosslinker 2/2000 ppm | 3 h 30 min | 3 h 45 min |
| 4 | 5 | Fresh water | Crosslinker 2/2000 ppm | 3 h 20 min | 3 h 35 min |
| 5 | 5 | Fresh water | Crosslinker 2/2000 ppm | 2 h 55 min | 3 h 05 min |
| 2 | 5 | Fresh water | Crosslinker 3/2000 ppm | 10 h 50 min | 13 h 10 min |
| 3 | 5 | Fresh water | Crosslinker 3/2000 ppm | 12 h 15 min | 14 h 45 min |
| 4 | 5 | Fresh water | Crosslinker 3/2000 ppm | 11 h 35 min | 12 h 55 min |
| 5 | 5 | Fresh water | Crosslinker 3/2000 ppm | 10 h 25 min | 11 h 15 min |
| 2 | 5 | Seawater | Crosslinker 2/2000 ppm | 14 h | 36 h |
| 3 | 5 | Seawater | Crosslinker 2/2000 ppm | 13 h | 38 h |
| 4 | 5 | Seawater | Crosslinker 2/2000 ppm | 12.5 h | 35 h |
| 5 | 5 | Seawater | Crosslinker 2/2000 ppm | 9.5 h | 33 h |
| 2 | 5 | Seawater | Crosslinker 3/2000 ppm | 12 h | 33 h |
| 2 | 5 | Seawater | Crosslinker 3/2000 ppm | 14 h | 35 h |
| 3 | 5 | Seawater | Crosslinker 3/2000 ppm | 12 h | 30 h |
| 5 | 5 | Seawater | Crosslinker 3/2000 ppm | 7 h | 28 h |

TABLE 6

Gel formation tests at 80° C., test conditions and results; the crosslinker was used in each case in an amount of 250 ppm.

| Polymer No. | Amount of polymer [% by wt.] | Medium | Time until attainment of gel code B [min] | Final strength Attained after [min] | Gel code attained |
|---|---|---|---|---|---|
| 6 | 3 | Seawater | 15 | 30 | J |
| 7 | 3 | Seawater | 15 | 30 | J |
| 8 | 2 | Seawater | 15 | 30 | I |
| 9 | 2 | Seawater | 15 | 30 | I |

The invention claimed is:

1. A process for producing mineral oil from underground mineral oil deposits, comprising at least the following process steps:
   (1) blocking permeable regions of the underground mineral oil deposit by injecting an aqueous formulation into the formation through at least one well, said aqueous formulation comprising at least one water-soluble, hydrophobically associating copolymer, and
   (2) injecting an aqueous flooding medium into at least one injection well and withdrawing mineral oil through the at least one production well,
   wherein
   the water-soluble, hydrophobically associating copolymer comprises
   (a) 0.1 to 15% by weight of at least one monoethylenically unsaturated, hydrophobically associating monomer (a) selected from the group of

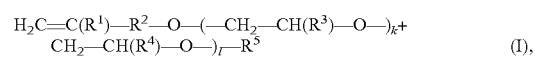

$$H_2C=C(R^1)-R^2-O-(-CH_2-CH(R^3)-O-)_k + CH_2-CH(R^4)-O-)_l-R^5 \quad (I),$$

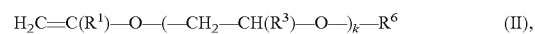

$$H_2C=C(R^1)-O-(-CH_2-CH(R^3)-O-)_k-R^6 \quad (II),$$

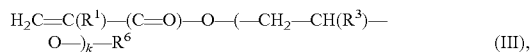

(III), where the $-(-CH_2-CH(R^3)-O-)_k$ and $-(-CH_2-CH(R^4)-O-)_l$ units are arranged in block structure in the sequence shown in formula (I) and the radicals and indices are each defined as follows:

k: a number from 10 to 150, l: a number from 5 to 25, $R^1$: H or methyl, $R^2$: a single bond or a divalent linking group selected from the group of $-(C_nH_{2n})-[R^{2a}]$, $-O-(C_nH_{2n'})-[R^{2b}]$ and $-C(O)-O-(C_{n'}H_{2n''})-[R^{2c}]$, where n, n' and n'' are each natural numbers from 1 to 6, $R^3$: each independently H, methyl or ethyl, with the proviso that at least 50 mol % of the $R^3$ radicals are H, $R^4$: each independently a hydrocarbyl radical having at least 2 carbon atoms or an ether group of the general formula $-CH_2-O-R^{4'}$, where $R^{4'}$ is a hydrocarbyl radical having at least 2 carbon atoms, $R^5$: H or a hydrocarbyl radical having 1 to 30 carbon atoms, $R^6$: an aliphatic and/or aromatic, straight-chain or branched hydrocarbyl radical having 8 to 40 carbon atoms, and also (b) 85 to 99.9% by weight of at least two monoethylenically unsaturated monomers (b) different than (a), where the monomers (b) comprise (b1) at least one uncharged, monoethylenically unsaturated, hydrophilic monomer (b1), which is (meth)acrylamide, N-methyl(meth)acrylamide, N,N'-dimethyl(meth)acrylamide or N-methylol(meth)acrylamide, and (b2) at least one monomer (b2a) and/or (b2b), where the monomers (b2a) and (b2b) are defined as follows:

(b2a) anionic, monoethylenically unsaturated, hydrophilic monomers which have at least one acidic group selected from the group consisting of $-COOH$, $-SO_3H$ and $-PO_3H_2$ and salts thereof, (b2b) (meth)acrylic esters of the general formula $H_2C=C(R^{15})-COOR^{16}$ where $R^{15}$ is H or methyl and $R^{16}$ is a straight-chain or branched alkyl radical having 1 to 8 carbon atoms, with the proviso that the amount of the monomers (b2b), if present, does not exceed 20% by weight, where the amounts are each based on the total amount of all monomers in the copolymer, the copolymer has a weight-average molecular weight $M_w$ of $0.5*10^6$ g/mol to $30*10^6$ g/mol, the amount of the copolymer in the aqueous formulation is 0.1 to 3% by weight, and the deposit temperature is 20° C. to 120° C.

2. The process according to claim 1, wherein the copolymer comprises monomers (b1) and (b2a) but no monomers (b2b).

3. The process according to claim 1, wherein the copolymer comprises monomers (b1) and (b2b) but no monomers (b2a).

4. The process according to claim 1, wherein the deposit temperature is 40° C. to 100° C.

5. The process according to claim 1, wherein the deposit temperature is 45° C. to 90° C.

6. The process according to claim 1, wherein the temperature of the aqueous copolymer formulation to be injected is selected such that it is lower than the deposit temperature.

7. The process according to claim 1, wherein the aqueous formulation is injected into the formation with a shear rate of at least 30 000 s-1.

8. The process according to claim 1, wherein the hydrophobically associating monomer (a) is at least one of the formula (I), and where $R^4$ is a hydrocarbyl radical having 3 to 10 carbon atoms, k is a number from 12 to 100, and $R^5$ is H, methyl or ethyl.

9. The process according to claim 8, wherein $R^4$ is an n-propyl radical, k is a number from 15 to 80, and $R^5$ is H.

10. The process according to claim 1, wherein the aqueous formulation further comprises water-soluble components which can bring about crosslinking of the polymer under deposit conditions.

11. The process according to claim 10, wherein the crosslinking components comprise at least one water-soluble compound selected from the group consisting of compounds comprising di-, tri- or tetravalent metal ions, organic compounds having at least two amino groups and aldehydes.

12. The process according to claim 1, wherein the copolymer further comprises at least one cationic, monoethylenically unsaturated monomer (b3) comprising ammonium ions.

13. The process according to claim 12, wherein the cationic monomer (b3) comprises salts of 3-trimethylammoniopropyl (meth)acrylamides, dialkyldiallylammonium and 2-trimethylammonioethyl (meth)acrylates.

14. The process according to claim 12, wherein the uncharged monomers (b1) are used in an amount of 30 to 95% by weight, and the anionic monomers (b2a) and cationic monomers (b3) together in an amount of 4.9 to 69.9% by weight, with the proviso that the molar (b2a)/(b3) ratio is 0.7 to 1.3, and where the amounts are each based on the total amount of all monomers used.

15. The process according to claim 1, wherein the injection of the aqueous polymer formulation is preceded by injection of an aqueous formulation of a polymer having cationic groups.

16. The process according to claim 15, wherein the process cycle of injection of a cationic polymer followed by the injection of the aqueous polymer formulation is repeated once or more than once.

17. The process according to claim 1, wherein the alkyl radical $R^{16}$ is a secondary alkyl radical $-CH(R^{17})(R^{17'})$ where $R^{17}$ and $R^{17'}$ are straight-chain or branched alkyl radicals, with the proviso that the total number of carbon atoms in the $R^{17}$ and $R^{17'}$ radicals is 2 to 7, and/or is a tertiary alkyl radical $-(R^{18'})(R^{18''})$ where $R^{18}$, $R^{18'}$, $R^{18''}$ are straight-chain or branched alkyl radicals, with the proviso that the total number of carbon atoms in the $R^{18}$, $R^{18'}$ an $R^{18''}$ radicals is 3 to 7.

18. The process according to claim 1, wherein monomer (b2b) is t-butyl (meth)acrylate.

19. The process according to claim 18, wherein process step (2) involves water flooding.

20. The process according to claim 1, wherein process step (1) involves injection through the injection well and then process step (2) is executed.

21. The process according to claim 1, wherein process step (2) is executed first, after water production rises, process step (1) is executed by injection into the production well, and then the production of mineral oil continues by renewed execution of process step (2).

* * * * *